United States Patent
Bloch et al.

(10) Patent No.: US 8,087,082 B2
(45) Date of Patent: *Dec. 27, 2011

(54) APPARATUS FOR FILTERING SERVER RESPONSES

(75) Inventors: Eric Bloch, San Mateo, CA (US); Shalabh Mohan, Mountain View, CA (US); Rajendraprasad R. Pagaku, Foster City, CA (US); Doug Moore, Houston, TX (US); Mark Krentel, Houston, TX (US); Bruce Thompson, So. San Francisco, CA (US); Julian R. Elischer, El Cerrito, CA (US); Brandon L. Golm, San Francisco, CA (US)

(73) Assignee: Ironport Systems, Inc., San Bruno, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/959,542

(22) Filed: Dec. 3, 2010

(65) Prior Publication Data
US 2011/0078309 A1 Mar. 31, 2011

Related U.S. Application Data

(63) Continuation of application No. 11/742,080, filed on Apr. 30, 2007, now Pat. No. 7,849,507.

(60) Provisional application No. 60/796,944, filed on Apr. 29, 2006.

(51) Int. Cl.
*G06F 11/00* (2006.01)
(52) U.S. Cl. ............... 726/22; 726/23; 726/24
(58) Field of Classification Search .......... 726/1, 11, 726/13–14, 22–26; 713/150–155, 187–188; 709/223–225, 229
See application file for complete search history.

(56) References Cited

U.S. PATENT DOCUMENTS

| | | | |
|---|---|---|---|
| 6,012,090 A | 1/2000 | Chung et al. | |
| 6,115,745 A | 9/2000 | Berstis et al. | |
| 6,411,952 B1 | 6/2002 | Bharat et al. | |
| 6,826,698 B1 * | 11/2004 | Minkin et al. | 726/1 |
| 6,886,013 B1 | 4/2005 | Beranek | |
| 7,272,853 B2 | 9/2007 | Goodman et al. | |
| 7,467,206 B2 | 12/2008 | Moore et al. | |
| 7,574,740 B1 * | 8/2009 | Kennis | 726/22 |
| 7,586,871 B2 | 9/2009 | Hamilton et al. | |
| 7,624,110 B2 | 11/2009 | Alagna et al. | |
| 2003/0014526 A1 | 1/2003 | Crutcher et al. | |
| 2003/0172167 A1 | 9/2003 | Judge et al. | |
| 2004/0122926 A1 | 6/2004 | Moore et al. | |
| 2004/0153512 A1 | 8/2004 | Friend | |
| 2005/0015626 A1 | 1/2005 | Chasin | |
| 2005/0204002 A1 | 9/2005 | Friend | |

(Continued)

*Primary Examiner* — Hosuk Song
(74) *Attorney, Agent, or Firm* — Hickman Palermo & Truong & Becker LLP

(57) ABSTRACT

A data processing apparatus, comprising at least one processor and a traffic monitor comprising logic which, when executed by the processor, causes the processor to perform: creating, using forward Domain Name System (DNS) lookups, a mapping of domain names to Internet Protocol (IP) addresses; determining whether a particular domain in the mapping requires handling data traffic to or from the particular domain by performing a particular action; based on the mapping, determining one or more IP addresses that are associated with the particular domain; generating policy for a firewall that instructs the firewall to perform the particular action upon receiving a particular request; wherein the particular request specifies a particular IP address that is within the particular domain.

18 Claims, 11 Drawing Sheets

U.S. PATENT DOCUMENTS

| | | |
|---|---|---|
| 2006/0010215 A1 | 1/2006 | Clegg et al. |
| 2006/0059238 A1 | 3/2006 | Slater et al. |
| 2006/0069697 A1 | 3/2006 | Shraim et al. |
| 2006/0206573 A1 | 9/2006 | Horvitz et al. |
| 2006/0212925 A1 | 9/2006 | Shull et al. |
| 2006/0218143 A1 | 9/2006 | Nijork |
| 2006/0253583 A1 | 11/2006 | Dixon et al. |
| 2007/0078936 A1 | 4/2007 | Quinlan et al. |
| 2007/0100795 A1 | 5/2007 | Davies |
| 2008/0114709 A1 | 5/2008 | Dixon et al. |
| 2009/0070872 A1 | 3/2009 | Cowings et al. |

* cited by examiner

APPARATUS FOR FILTERING SERVER RESPONSES

CROSS-REFERENCE TO RELATED APPLICATIONS; BENEFIT CLAIM

This application claims the benefit under 35 U.S.C. §120 as a Continuation of application Ser. No. 11/742,080, filed Apr. 30, 2007, now U.S. Pat. No. 7,849,507 which claims the benefit of Provisional U.S. Patent Application 60/796,944, filed Apr. 29, 2006, the entire contents of which are hereby incorporated by reference as if fully set forth herein, under 35 U.S.C. §119(e). The applicants hereby rescind any disclaimer of claim scope in the parent applications or the prosecution history thereof and advise the USPTO that the claims in this application may be broader than any claim in the parent applications.

TECHNICAL FIELD

The present disclosure generally relates to network data communications. The disclosure relates more particularly to preventing spyware and other threats from harming computer networks.

BACKGROUND

The approaches described herein are approaches that could be pursued, but not necessarily approaches that have been previously conceived or pursued. Therefore, unless otherwise indicated, the approaches described herein are not prior art to the claims in this or a subsequent application claiming priority to this application and are not admitted to be prior art by inclusion herein.

Spyware has evolved to become a significant security issue for computer users. For example, more than 80% of corporate PCs are infected with spyware, yet less than 10% of corporations have deployed perimeter spyware defenses. The speed, variety, and maliciousness of spyware and other web-based malware attacks highlight the importance of protecting enterprise networks at the perimeter from such threats.

DETAILED DESCRIPTION

Figure 1:
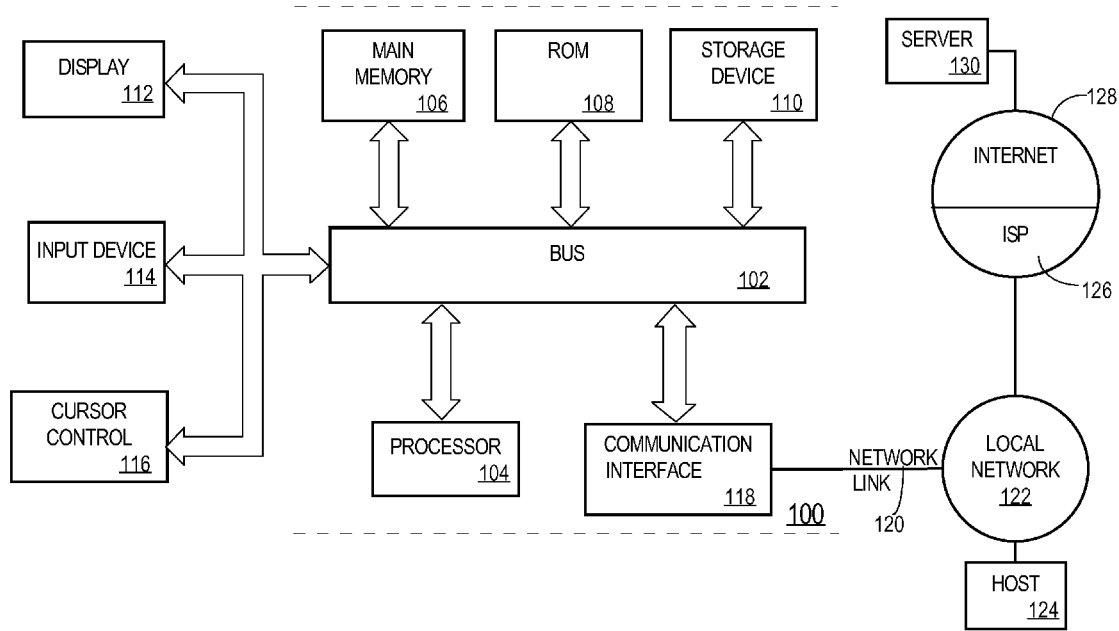
FIG. 1 illustrates a computer system with which an embodiment can be used.

A method, apparatus and computer program product for managing and monitoring network traffic and filtering responses are described. In the following description, for the purposes of explanation, numerous specific details are set forth in order to provide a thorough understanding of the techniques described herein. It will be apparent, however, to one skilled in the art that the present inventions may be practiced without these specific details. In other instances, well-known structures and devices are depicted in block diagram form in order to avoid unnecessarily obscuring the present inventions.

Embodiments are described herein according to the following outline:

1.0 General Overview
        1.1 Structural and Functional Overview
        1.2 Managing Network Traffic
        1.3 Filtering Responses
    2.0 Managing Traffic
        2.1 Deployment Scenarios
        2.2 Design Overview
        2.3 Traffic Monitor Spyware Database
        2.4 IPFW, DNS, DNS Snooping, Blocking, and Spoofing
        2.5 IP Blocking
        2.6 Logging, Reporting and Alerts
        2.7 Configuration
        2.8 Other Features and Examples
    3.0 Filtering Responses
        3.1 Design Outline
        3.2 Providing Response Content
        3.3 ACL Profiles
        3.4 Caching File System
        3.5 Contiguous Disk Format
        3.6 Split Disk Format
        3.7 Persistent Store
        3.8 Other Features and Examples
    4.0 Anti-Spyware Integration
        4.1 Anti-Spyware Features
        4.2 Sample Scenarios
        4.3 ACL Profile
        4.4 Alerts, Error Handling, Logging
        4.5 Wrapper, API, Socket Examples
        4.6 Configuration
        4.7 WRBS Table
        4.8 Multiple Scan Engines
        4.9 Verdict Caching
    5.0 Implementation Mechanisms—Hardware Overview
    6.0 Extensions and Alternatives
    1.0 General Overview In one embodiment, a data processing apparatus can perform HTTP traffic monitoring and filtering of HTTP requests from clients and responses from servers. Example apparatus comprises a processor; a first network interface to a protected network; a second network interface to an external network; a core hypertext transfer protocol (HTTP) proxy coupled to the processor and coupled to a content cache, wherein the HTTP proxy is configured to receive an HTTP request from a client computer in the protected network, send the request to a network resource in the external network on behalf of the client, and receive an HTTP response from the network resource on behalf of the client computer; and a plurality of spyware scanning engines (SSEs), wherein each of the SSEs is coupled to stored content signatures, and wherein each of the SSEs is configured to detect a particular kind of malicious software in an HTTP response.

In one feature, the logic is configured for scanning the response and determining two or more types of content in the response; based on the types of content in the response, selecting two or more of the SSEs for use in further evaluation of the response; providing a reference to the response to the selected two or more SSEs; receiving two or more verdicts about the response from the selected two or more SSEs; based on the verdicts, either generating and providing the client computer with a message indicating that the response is blocked, or providing the response to the client computer.

In another feature, the logic is configured for caching the verdicts. In a further feature, the logic is configured for receiving the two or more verdicts at different points in time, and generating and providing the client computer with a message indicating that the response is blocked upon receiving a first verdict that is negative with respect to malicious software and without waiting for any other verdict.

In yet another feature, the logic is configured for streaming at least a portion of the response to the client computer while waiting to receive the two or more verdicts.

In an embodiment, a computer acting as a mail proxy appliance provides protection against spyware and web-based malware, including managing network traffic into and out of an internal network to block or redirect the traffic to avoid malware, such as spyware, and a processing engine that enables multi-vendor signature-based filtering, such as for spyware.

For example, the proxy appliance can include application proxies for hyper text transfer protocol (HTTP), hyper text transfer protocol secure (HTTPS), and file transfer protocol (FTP), along with a traffic monitor for scanning traffic, such as at Layer 4 (L4), and a scanning and vectoring engine. The traffic monitor can scan ports and protocols at wire speed to detect and block downloads along with spyware "phone-home" activity. For example, a proxy appliance with the traffic monitor can track some or all of the 65,535 network ports so that malware that attempts to bypass port 80, which is typically used, can be detected and blocked. The processing engine uses object parsing and vectoring techniques with stream scanning and verdict caching.

The proxy appliance can employ other techniques as well, such as web reputations filters that analyze different web traffic and network-related parameters to evaluate the trustworthiness of a given URL. Modeling techniques are used to weigh the different parameters and generate a single reputation score on a scale of −10 to +10. Administrator policies can be applied based on the reputation scores when filtering user requests. Also, reputation data can be used for the dynamic vectoring and streaming engine to drive object vectoring and verdict caching decisions.

In the vectoring engine, multiple vendors scanning engines can be used to provide a more comprehensive anti-malware defense by providing verdicts for each object that is scanned. Each implementation can use one or more of the malware signature vendors, as desired, as part of the gateway proxy appliance.

The proxy appliance can be deployed in any of a number of modes, including but not limited to, as a transparent Ethernet bridge, an offline or tap deployment as a transparent secure proxy of a Layer 4 switch or a web cache communications protocol (WCCP) router, as well as deployment as an explicit forward proxy. The proxy appliance can be configured as a standalone proxy or as one of many proxies within an enterprise network.

Traffic can be monitored to provide both real-time and historical reports of Web traffic, threat activity, and prevention actions for the network being protected, including targeted lists of clients most infected within the network for targeted clean-up activities. Alerts can be generated to notify administrators of new issues and threats. Policies can be implemented for individual users, user groups, content sources, IP addresses, domains, URLs, etc. The proxy appliance can be used for any of a number of threats, including but not limited to, spyware, viruses, phishing, pharming, trojans, key loggers, and worms.

1.1 Structural and Functional Overview

Figure 2:
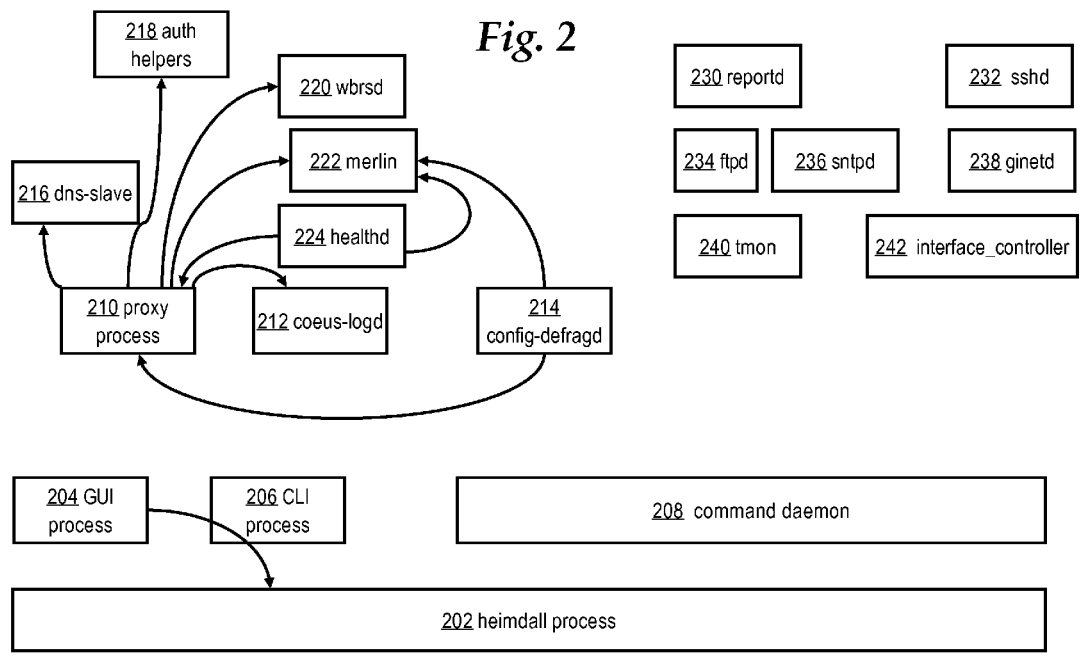
FIG. 2 depicts an example software architecture for a proxy appliance.

FIG. 2 depicts the processes and control on an example proxy appliance. In an embodiment, the proxy appliance is a combination of computer hardware and software that is logically coupled between the Internet and a protected network, such as an enterprise network. The proxy appliance may be integrated into a mail server.

In an embodiment, a proxy appliance comprises a heimdall process 202, which provides overall supervision of the system, a GUI process 204, a CLI process 206, and a command daemon 208. The GUI process 204 supervises generating and user interaction with a graphical user interface that enables an administrative user to interact with the proxy appliance. The CLI process 206 supervises generating and user interaction with a text-based command-line interface that enables an administrative user to have console-level access to the proxy appliance. The command daemon 208 implements or executes commands that are entered using the CLI.

The proxy appliance further comprises a proxy process 210, log daemon 212, configuration daemon 214, health monitor daemon 224, merlin process 222, web reputation service daemon 220, authentication helper processes 218, and DNS service process 216. In an embodiment, the proxy appliance further comprises a report daemon 230, secure shell daemon 232, file transfer protocol daemon 234, SMTP process 236 which implements simple mail transport protocol, ginetd daemon 238, monitor 240, and interface controller 242. In various embodiments, one or more of the preceding elements may be implemented in any of several programming languages such as JAVA or PYTHON.

Figure 3:
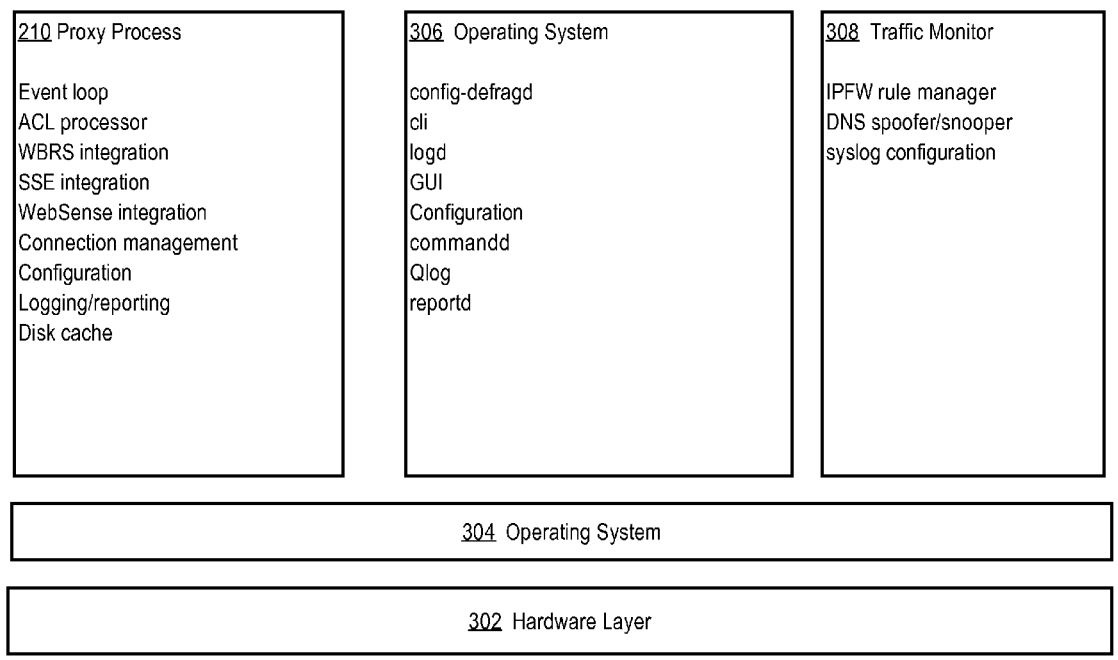
FIG. 3 depicts one embodiment of a proxy appliance and includes a core proxy process, an operating system, and a traffic monitor.

FIG. 3 depicts an embodiment of the proxy appliance in which a basic operating system 304 is hosted on a hardware layer 302 and supervises execution of the proxy process 210, a higher-level operating system 306, and a traffic monitor 308. Hardware layer 302 may comprise, for example, a Dell 2850 dual-processor computer with multiple disk drives. The hardware layer 302 may include an Intel Bypass Card so that if the proxy appliance fails, traffic bypasses the failed appliance. Basic operating system 304 may comprise, for example, FreeBSD. Higher-level operating system 306 may comprise, for example, the AsyncOS operating system from IronPort Systems, Inc., San Bruno, Calif. In other implementations, other operating systems and hardware can be used.

In the example depicted in FIG. 3, the proxy process is a single process that loops through an ACL processor (which includes web reputations service (WRBS) integration, spyware scanning engine (SSE) integration, and WebSense integration), connection management, configuration, logging/reporting, and a disk cache. However, in other implementations, the functions depicted as part of the proxy process of FIG. 3 can be distributed among multiple processes.

In an embodiment, traffic monitor 308 includes an Internet Protocol Firewall (IPFW) rule manager, a domain name service (DNS) spoofer/snooper, and a syslog configuration for facilitating the traffic monitor functions. The DNS spoofer/snooper monitors requests by domain and creates a list of the domain names with IP address returned via DNS lookup. Based on whether the domains are considered to be bad, malicious, or otherwise undesirable, the IPFW rule manager provide or update rules for a firewall using the IP addresses based on the list for those undesirable domains so that traffic to those domains can be blocked, redirected, or otherwise acted upon.

Figure 4A:
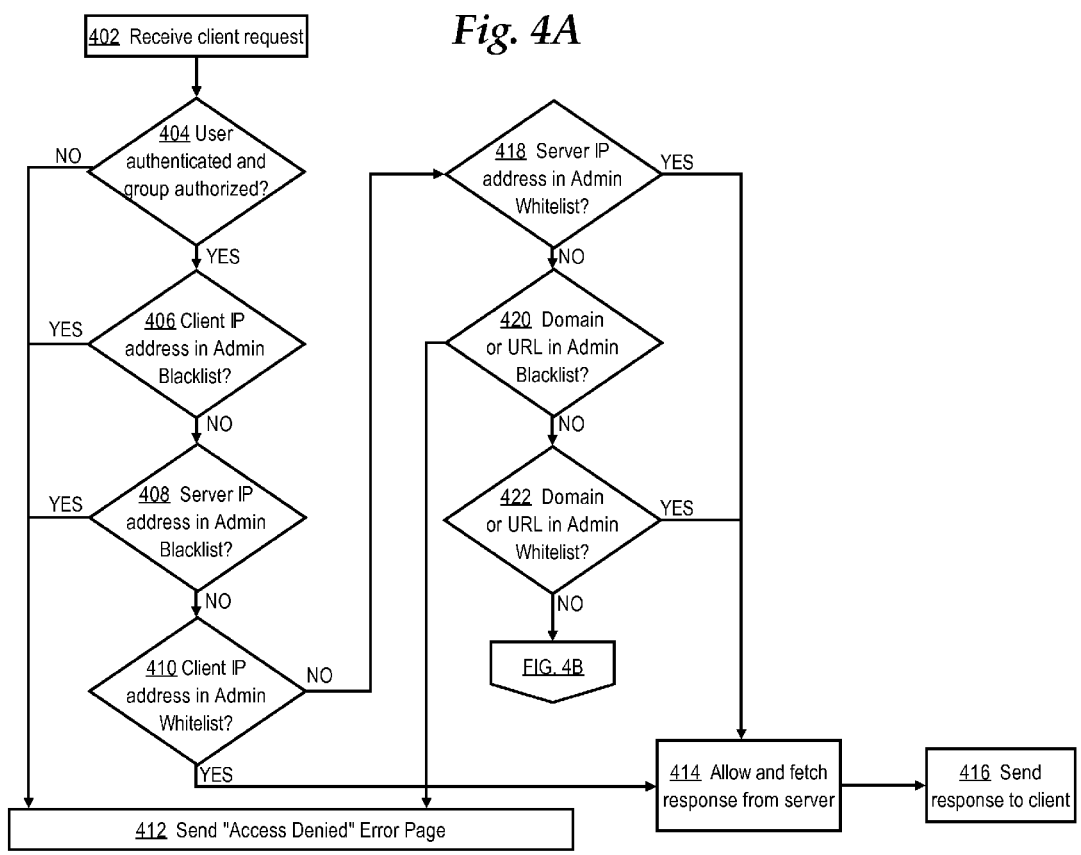
FIG. 4A and FIG. 4B illustrate detection techniques used in a proxy appliance.
Figure 4B:
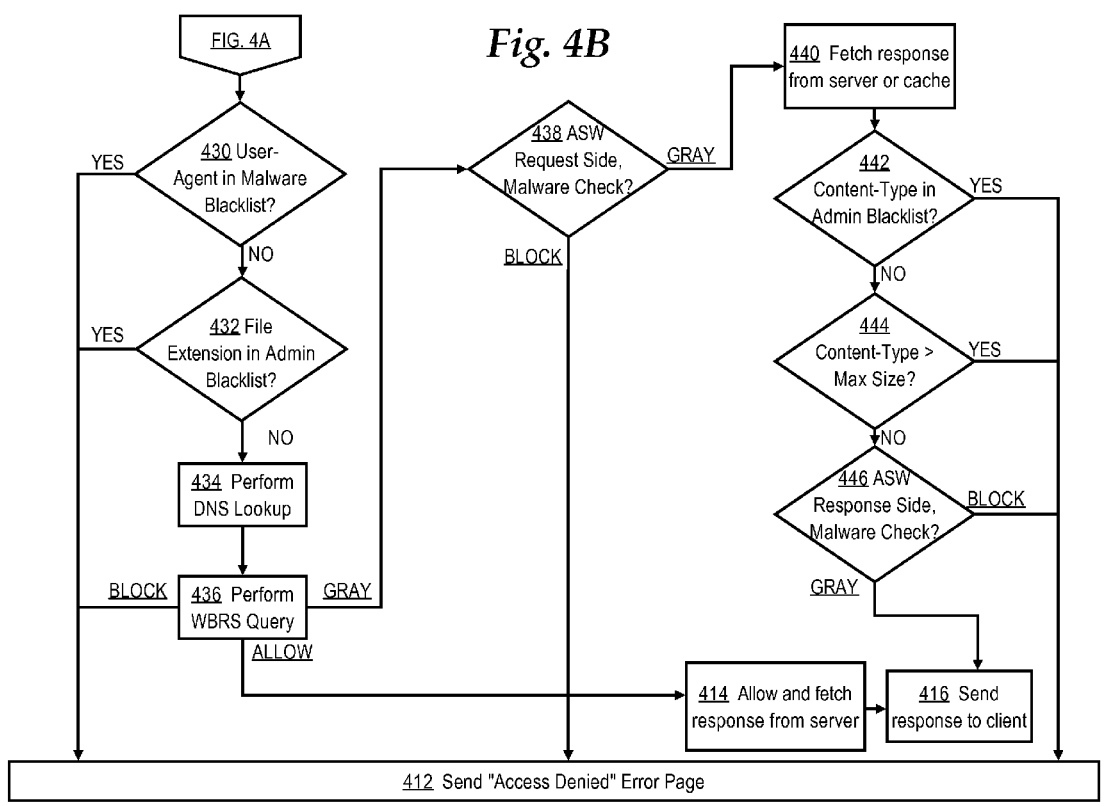

FIG. 4A and FIG. 4B illustrate detection techniques used in a proxy appliance, according to an embodiment. Referring first to FIG. 4A, in step 402 a client request is received. A client, in this context, typically is a computer located within the protected network that is seeking to retrieve information from an HTTP server, FTP server, or other network resource that is located outside the protected network. In step 404, a test is performed to determine whether a user associated with the client computer that initiated the client request has been authenticated, and whether the user is within a group of users that are authorized to access the requested resource. If the user is either not authenticated or not within an authorized group, then in step 412 the proxy appliance returns an "access denied" error page to the user. Thus, the user is not permitted to access external resources when the user is not authenticated or not within an authorized group.

If the user is authenticated and the user's group is authorized, then several checks are made for parameters associated with the client request. In step 406, the client IP address is checked against an administrator blacklist and in step 408 the server IP address is checked against the administrator blacklist. If either IP address is in the blacklist, then control transfers to step 412 in which the "access denied" error page is returned.

In step 410 and step 418, checks are made against administrator whitelists for both the client IP address and server IP address. If either of the IP addresses is in the respective whitelist, then control passes to step 414, in which the client request is allowed and the proxy appliance requests a network resource from a server on behalf of the client. When the response is received, the proxy appliance provides the server response to the client at step 416.

If the IP addresses are not found in the whitelists, then control transfers to step 420 and step 422 in which checks are made against an administrator blacklist and whitelist based on domain or URL. Thus, if the client IP address, server IP address, or domain/URL are blacklisted, access is denied, whereas if the client IP address, server IP address, or domain/URL are whitelisted, access is granted so that the response can be fetched from the server.

Referring now to FIG. 4B, in step 430, the user-agent is checked against a malware blacklist, as some user-agents identify themselves using a known identify, such as Gator, and then the file extension of the requested resource is checked against an administrator blacklist. If the user-agent is in the malware blacklist, or if the file extension is in the administrator blacklist, then access is denied at step 412. Note that in other embodiments, other types of blacklists, whitelists, graylists, or similar control mechanisms can be used, or some of the lists illustrated in FIG. 4A, FIG. 4B may be omitted or rearranged.

In step 434, if the client request has otherwise not been refused or allowed based on one of the previous tests, a DNS lookup is performed to obtain the IP address associated with a domain name or URL identified in the client request. At step 436, the proxy appliance issues a query to a web reputation score (WBRS) service. A web reputation score service is described, for example, in U.S. provisional application Ser. No. 60/802,033, filed May 19, 2006, the entire contents of which is hereby incorporated by reference for all purposes as if fully set forth herein. In response, the proxy appliance receives a reply from the web reputation score service indicating a reputation score value associated with the domain name or URL in the client request. The proxy appliance converts the reputation score value, based on internally maintained threshold values, into a determination whether the request should be allowed, blocked, or is gray (uncertain), depending on rules or policies established by the administrator.

If the result of step 436 is BLOCK, then control transfers to step 412 in which the "access denied" error page is sent. If the result is ALLOW, then control transfers to step 414, 416 in which the client request is allowed, a response is fetched, and the response is provided to the user. If the result is GRAY, then further testing is performed.

In step 438, an anti-spyware (ASW) check is made for the client request against a list of known malware. The ASW check may be performed by passing the client request to an ASW module within or external to the proxy appliance and requesting a result. If the result is BLOCK, then control transfers to step 412 in which an "access denied" error page is sent. If the result is GRAY, then in step 440, the response is fetched from the requested server or from the cache, if applicable. However, the response is not immediately provided to the client; instead, the content of the response is subjected to further tests.

In step 442 and step 444, the content of the response is checked to see if the content type is included in an administrator blacklist or in an administrator maximum size blacklist. If the content type of the response is found in either blacklist, then control transfers to step 412 in which access to the content is denied. If neither applies, then an anti-spyware response side check is made using one or more spyware scanning engine (SSE) processes or another ASW module. If the result of the response-side ASW check is BLOCK, then control transfers to step 412 in which access to the content is denied. If the response is not blocked by the result, or verdict, of the SSE(s), then in step 416 the previously retrieved response is sent to the client.

1.2 Managing Network Traffic

Generally, firewalls store records of and operate on Internet Protocol (IP) addresses, and thus actions taken by firewalls are to control access (e.g., usually to either allow or block access) based on IP addresses while operating in the kernel space itself. In one embodiment, a firewall is modified with additional state information and logic to take actions at the domain name service (DNS) level through the use of a traffic monitor. As a result, actions can be taken for domains or portions of domains instead of taking action only based on IP address, so that not all traffic from the corresponding IP address is affected or acted upon in the same way as with a typical firewall that acts based upon IP addresses alone. Also, by working based upon DNS addresses instead of IP addresses, domains and sub domains can be acted upon with the same actions even if the IP address associated with the domain or sub-domain changes.

The domain name system (DNS) is distributed throughout the world. Some entities have authority for some portions of the entire system, such as for some or all of major domains, such as the .com, .net, and .org domains. DNS uses two types of mappings: from domain names to IP addresses (e.g., names to numbers) and from IP addresses to domain names (e.g., numbers to names). The former are generally the most important, as most users navigate the Internet based on domain names that, when entered by the user via a browser, are converted to the corresponding IP address based on the DNS's mapping of domain names to IP addresses, a process typically referred to as a forward DNS lookup. When IP addresses are used, they are generally not used to look up the corresponding domain name via the other numbers to names mapping as the IP address as entered is used directly. However, to determine the domain name associated with an IP address, a reverse DNS lookup can be used to find the domain name.

One problem with DNS is that the numbers to names mapping is typically not as well maintained and up to date since that mapping is not heavily relied upon. Thus, the numbers to names mapping may be incomplete or contain incorrect information or mappings, and as a result, reverse DNS lookups may not return reliable or accurate results.

The numbers to names mappings often are "many to one" mappings in that one number, or IP address, maps to many different domain names (e.g., such as when a web hosting service hosts different domains at the same IP address). Note also that even in the names to numbers mapping, there can be "many to one" mappings since one domain name can be mapped to multiple IP addresses.

For example, assume that an administrator of a firewall or Internet traffic proxy wishes to block all traffic to a particular domain within yahoo.com. Assume further that the administrator has a suspect IP address that may or may not be associated with that particular domain to which the administrator wants to block access. If the administrator attempts to determine if that IP address is within that particular domain of yahoo.com via a reverse DNS lookup, the unreliability of the numbers to names mapping means that the administrator is unable to know with certainty if the lookup of the domain for the IP address via the numbers to name DNS mapping is providing a correct determination of whether or not the IP address is within the particular domain that the administrator wants to block.

Therefore, in one embodiment, the traffic monitor tracks forward DNS lookups and their results to create and maintain an internal list of domain names to IP addresses. This list effectively serves the same purpose and the names to numbers mapping that is part of DNS, but because the list is generated with results from the more reliable forward DNS lookups, the list is generally more accurate and reliable. Then, using the internal list of IP addresses to domains, additional information about the domains, such as a list of domains considered to be undesirable (e.g., they are known to be sources of spyware, phishing attacks, or other web-based malware), those domains can be blocked by identifying the corresponding IP address from the list, and then providing input to a firewall, such as in the form of a rule or policy, to take an action for that IP address (e.g., to block access to the IP address, etc.).

Figure 5A:
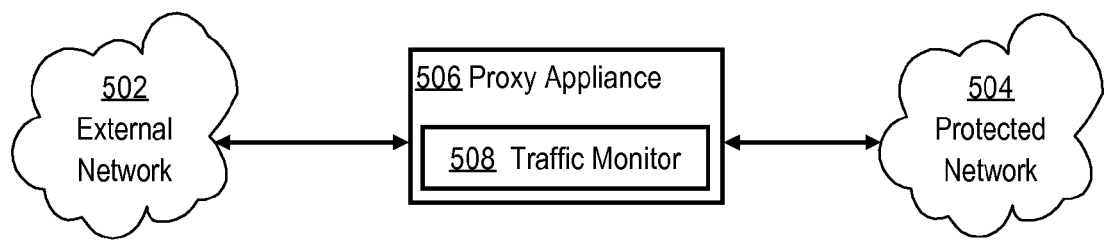
FIG. 5A and FIG. 5B illustrate deployment topologies for managing or monitoring traffic.
Figure 5B:
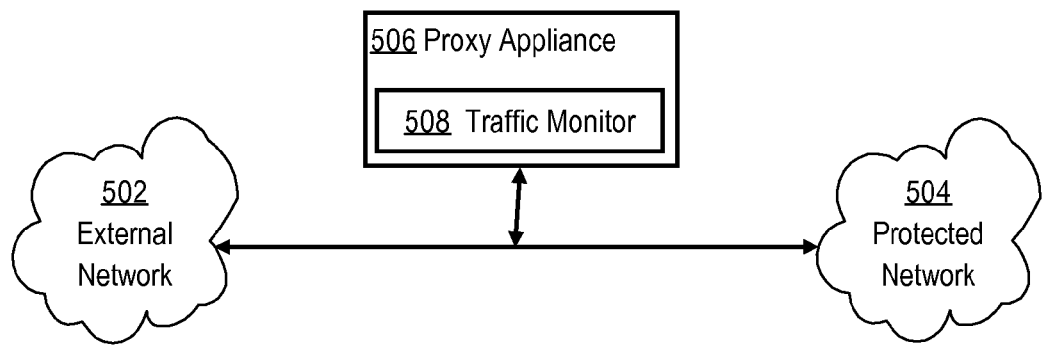

FIG. 5A and FIG. 5B illustrate deployment topologies for managing traffic. The techniques described herein for managing traffic can be implemented in any of a number of ways, including but not limited to those illustrated in FIG. 5A and FIG. 5B. In FIG. 5A, a traffic monitor 508 is hosted within a proxy appliance 506 that is coupled "inline" with respect to an external network 502 and a protected network 504. External network 502 may be a public packet-switched group of internetworks such as the Internet. Protected network 504 may comprise an enterprise network, home network, campus network, etc. In the arrangement of FIG. 5A, the proxy appliance 506 and traffic monitor 508 receive and inspect all network traffic between the external network 502 and the internal network 504.

In FIG. 5B, traffic monitor 508 is hosted within a proxy appliance 506 that is depicted in a "tap" or "non-inline" implementation such that all network traffic can be received and inspected by the proxy appliance, but not all network traffic necessarily passes through the proxy appliance. In this arrangement, proxy appliance 506 may be coupled to a Layer 4 switch or a WCCP router of protected network 504.

Figure 6A:
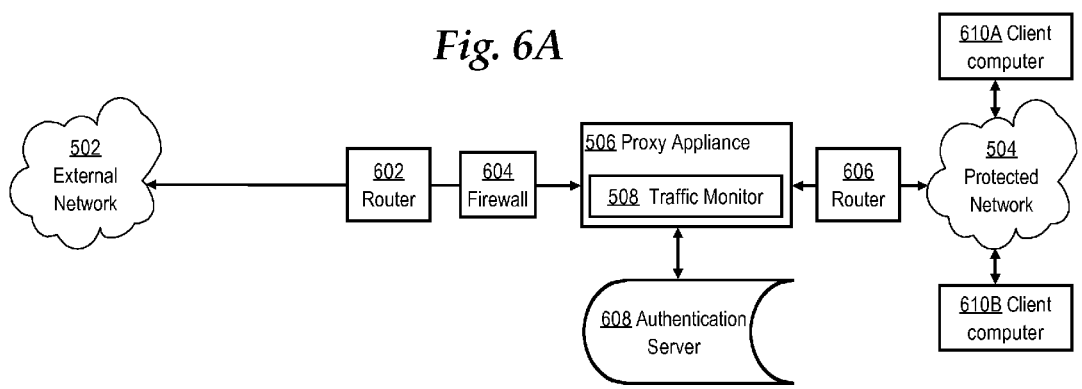
FIG. 6A, FIG. 6B illustrate further details of example deployment topologies of a proxy appliance.
Figure 6B:
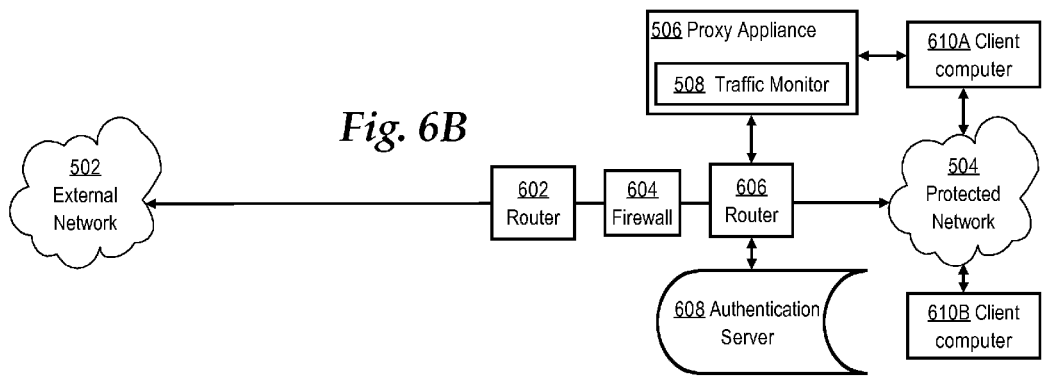

FIG. 6A, FIG. 6B illustrate further details of example deployment topologies of a proxy appliance. Referring first to FIG. 6A, external network 502 is coupled to proxy appliance 506 through an edge router 602 and firewall 604 that protect the protected network 504. The proxy appliance 506 is coupled to an authentication server 608 so that the proxy appliance can provide an integrated user authentication service, for example, using lightweight directory access protocol (LDAP), Microsoft Active Directory, etc. The proxy appliance 506 is coupled to protected network 504 through router 606. Client computers 610A, 610B are coupled to protected network 504. Any number of client computers or other end station devices may be used.

Referring to FIG. 6B, external network 502 is coupled to proxy appliance 506 through an edge router 602 and firewall 604 that protect the protected network 504. A second router 606, which may be located anywhere within network 504, is coupled to the proxy appliance 506 and authentication server 608. The second router 606 may comprise a WCCP router or a Layer 4 switch. Client computers 610A, 610B may be coupled to protected network 504 and one or more of the client computers may connect to the proxy appliance 506 in forward mode.

In either the inline implementation of FIG. 5A, 6A, or the tap implementation of FIG. 5B, 6B, the traffic monitor 508 can inspect all DNS traffic between the Internet and the protected network 504. By inspecting all the DNS traffic, the traffic monitor 508 can detect all forward DNS lookups that any web client within the protected network 504 is using, and thus the traffic monitor can receive the results of DNS resolution of domain names to IP addresses for the protected network 504. As a result, traffic monitor 508 can create and manage a list of IP addresses to track which IP addresses were triggered by DNS lookups for which domain names. The process of developing the list of IP addresses based on DNS resolutions for domain names used by the client computers 601A, 610B on the protected network 504 can be referred to as "DNS snooping" or "DNS discovery."

Through such DNS snooping and by creating the list of IP addresses associated with domain names based on observing all the DNS lookups from the internal network (protected network 504), an administrator of the internal network can block any desired IP addresses associated with a domain that the administrator wishes to block access to by users on the internal network. Access can be simply blocked, or the administrator can redirect requests to the undesirable domain to a different domain, thereby precluding access to the undesirable domain by the users on the internal network. The process of preventing access to IP addresses associated with domains that the administrator wants to prevent access to can be referred to as "DNS blocking," such as when access is simply precluded, or "DNS diverting" or "DNS spoofing" when traffic is diverted to another domain instead of the undesirable domain.

Thus, proxy appliance 506 is configured as a "DNS snooping proxy," a "DNS snooping server," or a "DNS traffic management server" because users may or may not be allowed to access some IP addresses that are associated with domains that the administrator of the internal network has determined are undesirable, based on the list of IP addresses to domain names that is developed by snooping the DNS traffic between the Internet and internal network. Note that generally, a "DNS proxy" refers to a server that handles DNS traffic and performs reverse DNS lookups of IP addresses based on domain names, but does not perform the "snooping" process described above to create a list of IP addresses to domain names that can be used in lieu of the unreliability numbers to names mapping of conventional DNS servers.

Based on the list of IP addresses and domain names based on the DNS snooping process, any IP addresses for which the administrator wishes to log activity, or to which the administrator wishes to block access, can be communicated to a firewall with instructions to have the desired activity logged or access blocked using the firewall's normal functions. Thus, proxy appliance 506 can communicate logging requests or blocking requests to firewall 604 and the proxy appliance does not need to have direct responsibility for logging or blocking.

When DNS lookups are used for creating the mapping of IP address to domains based on the DNS traffic being monitored, DNS servers typically specify a time to live (TTL) value for the result. For example, when a DNS server responds to a DNS lookup of an IP address with a particular domain name, the result may be accompanied by a TTL of 10 minutes, meaning that the mapping of that IP address to the domain name is valid for the next 10 minutes. The TTLs returned in the DNS lookups can be included in the list of IP addresses to domains that is created by the DNS snooping process, such that entries in that list are considered to be expired once the TTL is reached. Various embodiments may or may not to include the TTLs in the list of addresses to domains and may or may not rely upon the TTLs when using the mappings of IP addresses to domain names based on the DNS snooping process.

Figure 7:
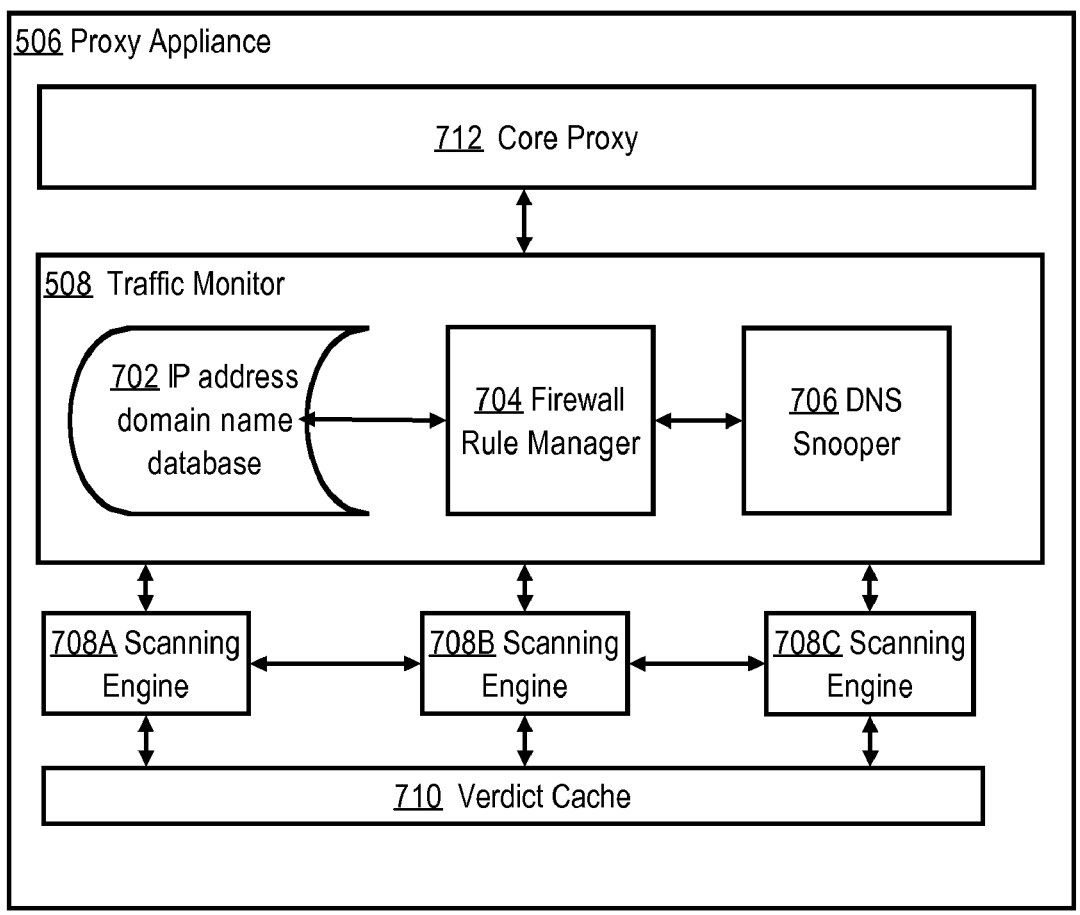
FIG. 7 illustrates a high-level architecture of a traffic monitor in a proxy appliance.

FIG. 7 illustrates an embodiment of the internal organization of an example proxy appliance and traffic monitor. Proxy appliance 506 comprises a core proxy 712 that can proxy client requests for network resources, to intercept the requests and responses to enable inspection of traffic. Core proxy 712 is coupled to a traffic monitor 508. In one embodiment, traffic monitor 508 comprises a database 702 that maps IP addresses to domain names, a firewall rule manager 704, and a DNS snooper 706. The database 702 is one implementation of a list of IP addresses to domain names based on DNS snooping as described herein. Records in database 702 are associated with IP addresses. The database 702 may include other information for each entry, such as the TTL value, along with the action to take, if any, for the IP address (e.g., to block, redirect to another IP address, etc.).

The firewall rule manager 704 acts based on the entries in the database 702 to add or update rules for a firewall, such as firewall 604 of FIG. 6A, to implement the desired actions. For example, if an entry is added to the database 702 that associates a particular IP address to a domain, and the administrator has specified that traffic to that domain is to be redirected to a different domain, the firewall rule manager 704 creates and communicates a rule to the firewall so that traffic to the IP address is redirected to the different domain.

As a result, by using a list of domains of interest, the traffic monitor 508 can allow for logging, blocking, or redirecting of traffic to those domains of interest by providing rules for use by a firewall 604 that normally operates on IP addresses and is thus not able to act based simply on a list of domains. Thus, the traffic monitor 508 is able to cause the desired actions for specified domains to be taken by the firewall 604 based on the IP address to domain mappings developed by the DNS snooping techniques described herein.

The DNS snooper 706 monitors DNS traffic to obtain data for entries in database 702. For example, when a DNS lookup is performed, DNS snooper 706 associates the domain name used in the DNS lookup to the IP address returned by the DNS server (plus any other information returned, if desired) and then passes that information to the database 702 so that a database entry can be created (or updated) based on the results of the DNS lookup.

In some implementations, the traffic monitor 508 is provided with a list of domains and/or IP addresses of interest, such as from an administrator, and traffic associated with those domains and/or IP addresses is acted upon. For example, the administrator may have a list of bad, malicious, or otherwise undesirable domains for which traffic is to be monitored, logged, and possibly blocked or redirected, as desired. The traffic monitor 508 receives the list, observes DNS traffic and DNS lookups, and upon identifying that the IP address for a domain is on the list of IP addresses or domains of interest, the traffic monitor causes the desired action to be taken.

The list of IP addresses and/or domains of interest, which likely, but is not always, a list of "bad" actors, can be obtained from any source. In one embodiment, a web reputation service that establishes a reputation score, such as on a scale of −10 to +10, for a domain or sub domain based on a uniform resource locator (URL), IP address, and/or domain name, can be used to establish the list of domains of interest. In an embodiment, the traffic monitor 508 uses results received from the web reputation service to create a list of domains of interest that includes all those domains with a web reputation score of less than zero (e.g., those domains with a negative reputation).

Other mechanisms for determining "good" versus "bad" domains can be used, such as receiving data from a third party or blacklist that supplies a list of "bad" domains that are determined independent of web reputation scores described above. Additionally or alternatively, traffic monitor 508 can receive a list of domains and/or IP addresses that include both good and bad domains or addresses, and then select those domains or addresses that the traffic monitor is to manage. For example, the administrator can instruct the traffic monitor 508 to consider all domains on the incoming list with a score of less than −5.

In another embodiment, core proxy 712 performs responsive actions, rather than having traffic monitor 508 or firewall 604 perform responsive actions. For example, if traffic is to be blocked, then core proxy 712 can provide the user with a page that explains that the user is being blocked and including other information, such as contact information to unblock the traffic, since the proxy understands the protocols being used. Also, the core proxy 712 can scan content, such as the content of responses.

In contrast, firewall 604 typically just blocks packet traffic without informing a user about what traffic is blocked. However, a firewall 604 typically monitors all ports, whereas a proxy may only monitor some ports. Thus, traffic on a port not being monitored by the core proxy 712 can be controlled by the firewall 605 but not by the core proxy 712. The firewall can act upon non-HTTP traffic, such as traffic to an Internet relay chat (IRC) server based on rules provided by the traffic monitor 508 that are generated based on the database 702 of IP addresses to domains, whereas the core proxy 712 may not be capable of monitoring and/or acting upon such IRC traffic.

In an embodiment, traffic monitor 508 receives and works with multiple lists. For example, the traffic monitor 508 receives a first list of domains and IP addresses, such as a list of domains and IP addresses of interest in the form of those determined to be bad. The first list is not a mapping of IP addresses to domains. The traffic monitor 508 then creates and maintains a second list, or mapping, of IP addresses to domains for those IP addresses and domains on the first list. The second list can include other state information, such as TTL value. An administrator can modify the second list to add to or remove entries on the second list. The traffic monitor 508 uses the second list to generate input, such as rules or policies, for the firewall 604. The rules or policies allow firewall 604 to block or allow traffic on specified ports based on specified IP addresses.

In some implementations, the administrator can specify that the core proxy 712, the traffic monitor 508, or both are to be used to take actions. For example, if both the core proxy 712 and traffic monitor 508 are used, then the traffic monitor can be configured to inspect only traffic that is allowed through the core proxy 712. Thus, the traffic monitor 508 cannot inspect traffic that is not blocked by the proxy when the proxy is acting upon the information from the traffic monitor.

In other implementations, the core proxy 712 is used without traffic monitor 508, although the traffic monitor can still log, block, or redirect traffic based on information previously provided by the traffic monitor or from another source. Also in other implementations, only traffic monitor 508 is used, without proxying, but traffic can be controlled by the traffic monitor providing input to firewall 604, which takes prescribed actions on the basis of the provided IP addresses.

In some implementations, instead of monitoring an IP address or domain, traffic for one or more uniform resource locators (URLs) associated with the same IP address or domain is monitored and actions are taken in response. For example, for a domain primarily used by bloggers, there may be a few blogs out of thousands that are considered bad or otherwise undesirable, for which the administrator of the proxy appliance 506 wishes to block or redirect traffic between the undesirable blogs and users in the protected network. Traffic monitor 508 can supply input to a device such as core proxy 712 and thereby block or redirect traffic to those undesirable URLs of that larger domain, while leaving access to the remainder of that domain unaffected.

In some implementations, another system or entity provides the list of domains and/or IP addresses that are considered suspect, bad, or undesirable, which is then used by the traffic monitor to determine which traffic to monitor more closely. The system or entity may be other than a vendor of the proxy appliance 506 and an entity associated with the protected network. The proxy appliance 506 receives the list over a public network such as the Internet. An administrator of the proxy appliance 506 then decides what actions, if any, are to be taken with respect to the traffic for each of the listed domains and/or IP addresses. Example actions may include logging the traffic, reporting on the traffic, blocking the traffic, redirecting the traffic to another IP address and/or domain, or blocking the DNS lookups for the domains at the proxy appliance.

In an embodiment, the administrator also can turn the traffic monitor 508 on or off, or configure the core proxy 712 to place all domains/IP addresses on the list of undesirable domains/IP addresses that subject to the same responsive actions. Example responsive actions may comprise as logging the traffic to those domains or blocking all access to those domains. Alternatively, the administrator can configure the proxy appliance to take action based on groups of domains/IP addresses or by subnets. In addition, the administrator can develop a list of domains and can configure the core proxy 712 to take actions against the domains on the list in the same ways as in using a list of undesirable domains from another source.

1.3 Filtering Responses

Certain systems can filter URLs by inspecting an HTTP request, such as by examining request headers or time of day, or by examining the type of file that is returned in an HTTP response as specified in the response header. For example, the response header may identify the response as a JPEG file, and the administrator may have decided to block all JPEG files. However, URLs and domains can be easily changed and often are moved around, particular by providers of malicious content to avoid such techniques that are designed to avoid the malicious content, although the malicious content remains the same when such URLs are changed. Also, in taking actions based on response headers, prior systems assume that the response header accurately describes the content of the response, which may not be true since some content providers may provide inaccurate information in the response header to avoid such attempts at blocking the content.

Some systems are based on the Internet Content Adaptation Protocol (ICAP) of IETF RFC 3507, which describes a network protocol for sending HTTP requests from one device to another. With ICAP, systems use a network protocol between a process on a proxy appliance and either another process on the same appliance or on a different appliance. When ICAP is implemented between a first proxy appliance and a second proxy appliance, performance is generally not acceptable, and when ICAP is implemented between processes on the same proxy appliance, the amount of required data transfer is still significant. While ICAP can provide some means of protection, the resulting performance is generally unacceptable.

Also, such approaches operate by providing all of the content to be scanned to the process performing the scan, which can further degrade performance, particularly when the size of the content is large more than several megabytes.

In an embodiment herein, techniques are provided for examining the content of the responses themselves within the bodies of the responses, instead of examining just the headers associated with the responses. Referring again to FIG. 7, in an embodiment, a proxy appliance comprises one or more spyware scanning engines (SSEs) 708A, 708B, 708C configured to scan the body of responses from servers. Spyware scanning engines 708A, 708B, 708C may scan the body of the responses. Additionally or alternatively, the body of requests can also be scanned.

Results ("verdicts") returned by the SSEs 708A, 708B, 708C can be cached in a cache 710. When results of SSEs are cached, the verdicts for subsequent requests for the same content can be determined based on the verdict cache, thereby precluding the need to fetch and rescan the content, improving performance. Based on the capabilities of the SSEs, requests to scan response content can be directed to one or more SSEs that are best suitable for the type of content in the response body, thereby improving overall performance. In addition, the SSEs can request portions of the content to be scanned, as necessary to determine the verdict for the content, thereby eliminating the need to always provide an SSE with all of the content.

Generally, SSEs 708A, 708B, 708C operate using either random access to data or streaming access to data. In the random access approach, an SSE has random access to a file that is to be scanned, and the SSE can read parts of the file, or even reread parts of the file, in any order, once the SSE has received the file. In the streaming approach, the SSE has streaming access to a file that is to be scanned, and the SSE scans blocks of the file in order from the start of the file once the SSE has the file.

In either approach, an SSE may determine a verdict after scanning the entire content of the file or before completing a scan. The verdict is a determination about whether the file is undesirable or not based on one or more criteria and other input data. Other input data may comprise a database of signatures of malicious or undesirable content. In an embodiment, in either the random access approach or streaming approach, only enough of the response body is scanned by the SSE as is necessary to determine a verdict.

Figure 8:
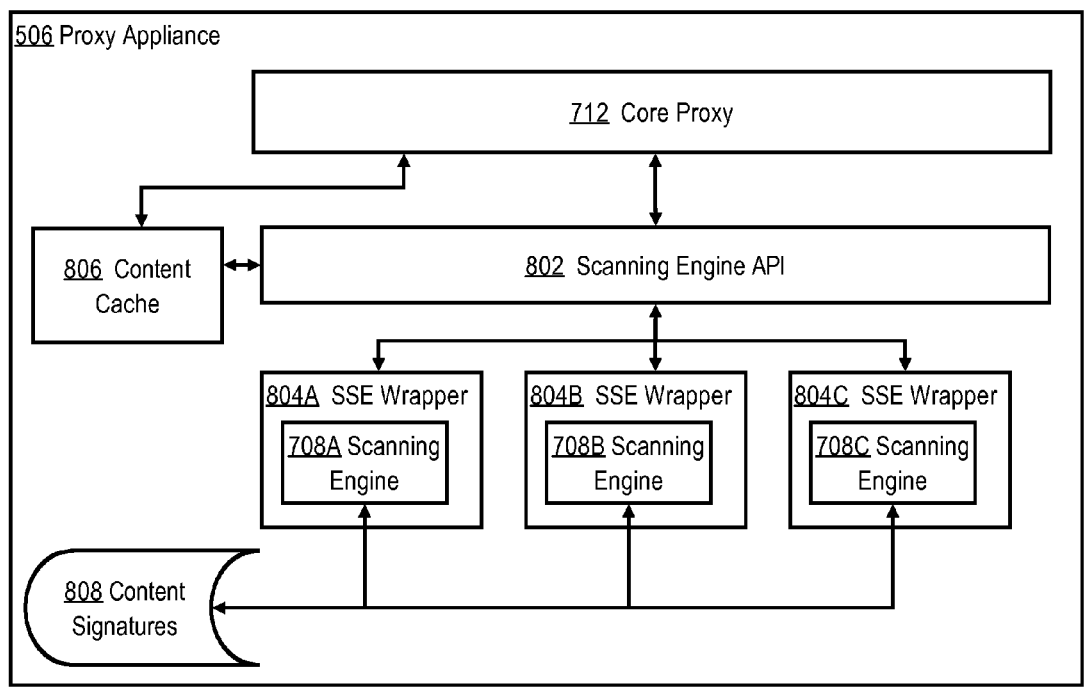
FIG. 8 illustrates an architecture of a proxy appliance.

FIG. 8 illustrates an embodiment a proxy appliance configured to perform response filtering. In FIG. 8, proxy appliance 506 includes a core proxy 712 configured to perform primary proxy functions, an SSE application programming interface (API) 802 that manages interaction with the SSEs 708A, 708B, 708C through wrappers 804A, 804B, 804C, and a cache 806 configured to store content of response bodies that is to be scanned. The cache 806 may be maintained in disk storage or memory. SSEs 708A, 708B, 708C are coupled to a content signature database 808.

In operation, when the core proxy 712 determines that response filtering should be applied to a particular response, the core proxy notifies the SSE API 802. The SSE API 802 determines which of the available SSEs 708A, 708B, 708C should scan the response. The SSE API 802 then provides a file handle to the SSE wrapper 804A, 804B, or 804C of the selected SSEs 708A, 708B, 708C, and the SSE wrapper uses the file handle to retrieve some or all of the content from the cache 806 for scanning by that SSE. The SSE wrapper 804A, 804B, 804C manages the interactions with the associated SSE.

By providing a file handle to the SSE 708A, 708B, 708C via the SSE wrapper 804A, 804B, 804C, instead of providing the entire file to the SSE, the SSE can control how much and which portions of the content to be scanned are sent to the SSE. Since the SSE can often determine the verdict for the content by examining a fraction of the overall content, the amount of data transferred to the SSE to obtain a verdict can be significantly reduced.

Although the SSEs 708A, 708B, 708C in FIG. 8 are illustrated as within the SSE wrappers 804A, 804B, 804C, the SSEs may be located separately from the proxy appliance 506, and the SSE wrappers may be configured as interfaces between the proxy appliance and the SSEs. Thus, a particular SSE 708A, 708B, 708C may be located at a third party that provides a spyware scanning service as requested by the proxy appliance. Interactions between the SSE wrappers and SSEs may occur via the Internet. Alternatively, an SSE may be a separate application that is running on the proxy appliance 506 or on another computer or system located with the proxy appliance.

In an embodiment, Each SSE 708A, 708B, 708C utilizes the content signature database 808 to identify whether or not content received in a server response is "bad." For example, database 808 may comprise a database of spyware signatures, such as a listing of MD5 hashes for known spyware. When the response body is scanned, the scanning engine computes an MD5 hash of some or all of the content, and compares the result to the database of signatures. A match indicates that the content is spyware.

A particular SSE can employ any means for generating signatures of any type of content and can employ any means of comparing signatures of suspect content to the database of signatures. In addition, an SSE can employ multiple databases for multiple types of undesirable content, not just spyware, and multiple databases for different types of content, such as one for text files, another for JPEG files, another for JavaScript, etc. Thus, database 808 of FIG. 8 broadly represents one or more signature databases.

In one example of operation, an HTTP request is received by the proxy appliance 506. One or more threshold techniques may be applied to the request, such as applying a web reputation filter, which may or may not result in blocking the request. If the request is not blocked and a response is then received in response to the request, then the core proxy 712 saves the content to the content cache 806.

The core proxy 712 then determines whether the response should be scanned. If the content is to be scanned, the core proxy 712 notifies the SSE API 802. The SSE API 802 checks the incoming response to see what type of content is included, such as by scanning the first portion of the content. Based on a content type that is identified by the SSE API, the SSE API selects one or more SSEs 708A, 708B, 708C to scan the content, such as by using a list of the SSEs and the content types that each SSE can scan or is best suited to scan. Such a list of SSEs by content type can be provided and maintained by any suitable source, such as the administrator of the network, the provider of the proxy appliance 506, a third party, etc.

The SSE API 802 forwards a file handle for the file to one or more SSE wrappers 804A, 804B, 804C for the selected SSEs. Each SSE wrapper interacts with the SSE, such as through remote procedure calls (RPCs) to facilitate retrieving some of the file or the entire file from the content cache 806 based on the file handle and supplying the SSE API with the verdict from the SSE's scan. Each SSE can retrieve content when and as needed, so that not all of the content is retrieved by the SSE or that the SSE retrieves content over time as the content is needed by the SSE, using either the random access approach or the streaming approach described above. The decision to scan the content and the scanning by an SSE can take place as the content is being received by the application proxy. Therefore, for larger files, content can be scanned and a verdict can be returned even though all of the content is not yet received by the proxy appliance.

The proxy appliance 506 can receive content and provide the content to the SSEs in any of a number of ways. For example, proxy appliance 506 is configured to allow an SSE 708A, 708B, 708C to begin retrieving response content from the content cache 806 before all the response content is received, which can be beneficial when a response is large. The proxy appliance 506 also can be configured to only allow access to the response content after all of the content is received by the proxy appliance. The proxy appliance can be configured to sometimes allow access before all the response content is received and sometimes require that all content is received before allowing such access, based on the size of the response body.

In an embodiment, the SSE determines how much of the content for a particular response is to be retrieved and when, so that only the content that the SSE requires for scanning is transmitted. Thus, the SSE pulls content as needed by the SSE. This approach offers greater efficiency than providing the SSE with all content even if the SSE does not require all of the content to determine a verdict, because unnecessary data transfer is involved.

A response can be scanned by multiple SSEs and the proxy appliance 506 can act based upon one or more of the verdicts. In some implementations, once a first negative verdict is received, the proxy appliance 506 terminates scanning by the other SSEs. A negative verdict indicates that the content includes spyware or other malware. For example, if the first verdict is negative, then the proxy appliance 506 acts based upon that first negative verdict. In other implementations, the proxy appliance 506 waits for all the verdicts from the selected SSEs to be obtained so that the proxy can make a final determination based on all of the verdicts. Thus, the proxy appliance 506 can act based upon the most common verdict, act based upon a combination of the verdicts, or act based upon the worst or best verdict.

In still other implementations, if multiple SSEs are selected, the response bodies are scanned sequentially by the SSEs. The proxy appliance 506 waits for all of the SSEs to complete their scans in sequence. The proxy appliance 506 acts upon the first verdict received that indicates the content is undesirable. In other implementations, some scans by multiple SSEs can occur at the same time while scans by other SSEs are not initiated until previous scans by other SSEs are complete. In general, multiple SSEs can be configured or directed to scan the same response body in any arrangement or order.

The SSE API 802 can select one or more SSEs 708A, 708B, 708C to scan a particular body based on the type of content in the body, such as the file type included in the response body based on looking at the first portion of the response body, the MIME type as specified in the response header, etc. For example, one or more SSEs 708A, 708B, 708C may be viewed as particularly well suited to scanning JPEG files, while another SSE is considered to be good for Java files, and yet another SSE is ideal for .zip files. Thus, if the response includes a JPEG, the SSEs suited to JPEG scanning are selected whereas if the response includes JavaScript, the SSE suited for Java is chosen. Other content types can include, but are not limited to, compressed files or content, text content, binary content, etc.

Generally, an SSE 708A, 708B, 708C is configured to evaluate signatures for one or more content types, but not all content types. Even if a particular SSE covers all content types, some SSEs may be more focused and have more signatures for certain file types as compared to other file types. Thus, while every response body could be sent to every available SSE, doing so would be unnecessary or inefficient, particularly if the SSE contains few or no signatures for one or more types of response. Therefore, SSE API 802 intelligently chooses particular SSEs to be sent a particular response based on the capabilities of the SSE, the performance of the SSE (e.g., avoiding those SSEs with slower performance in preference for those SSEs with better performance), or any other factor. Using this approach, the proxy appliance 506 embodies a DYNAMIC VECTORING™ technology to direct response bodies to those SSEs best suited for the particular type of content in each response.

The SSEs also can be chosen to help distribute requests of the proxy appliance 506 among different SSEs to achieve better overall performance. The degree to which multiple SSEs are used can be based on the administrator of the proxy appliance balancing the perceived need for security against the performance and resources required to perform multiple scans, which is generally implementation and enterprise specific.

In addition, some implementations can determine how to perform response body scanning based on the source or destination of the request-response interaction. For example, for a particular user, group of users, an IP address, or a subnet, more or less restrictive response body scanning can be employed, as specified by the administrator of the proxy appliance. As a specific example, for one group, content scanning can be configured to only employ a single SSE for JPEG files, whereas for another group, content scanning is configured to employ all SSEs capable of scanning a particular type of content. As yet another example, scanning can be configured based on where the content is coming from.

Thus, for content from a domain that is known to rarely include undesirable content, less scanning can be employed, whereas for another domain that is known to often include spyware or other undesirable content, all SSEs capable of scanning the type of content are employed and the proxy appliance awaits verdicts from all the SSEs before making a final determination about whether to allow or block the response. Therefore, security policies can be established based on the source of the request, the source of the response, and also the type of content included in the response. For example, some types of content, such as JavaScript, may be scanned more carefully, whereas other types of content, such as simple text, are scanned by fewer SSEs.

In some embodiments, the verdicts returned by the SSEs are cached in the verdict cache 710 (FIG. 7). For example, for a particular HTTP request from a particular URL, a previous response was already scanned by one or more SSEs, resulting in one or more verdicts from those SSEs and a final determination by the proxy appliance about what action to take with respect to the particular response (e.g., block, allow, etc.). Thereafter, if another request to the same URL is made, instead of requesting, receiving, and then rescanning the response body, the proxy appliance can act based on the previous verdict(s) obtained from the verdict cache 710 rather than obtaining the same response and then having the SSE(s) perform new scans of the response body. In some implementations, a previously cached verdict is retrieved from verdict cache 710 in response to receiving a server response that is determined to be the same as a previous response instead of acting upon the same request, since in some cases the responses to the same request may be different (e.g., the content has changed during the time between the responses).

In an embodiment, verdict cache 710 is implemented as part of the SSE API 802, the SSE wrappers 804A, 804B, 804C, or a combination thereof. For example, for verdicts cached with the SSE API 802, the SSE API may rely upon a previous verdict for a response without sending requests to any SSEs to have the response body scanned. For verdicts cached with the SSE wrappers 804A, 804B, 804C, the SSE API 802 sends requests to the SSE wrappers for scanning by the associated SSEs, but prior to having the SSE actually scan the response body, the SSE wrapper decides to use a previous verdict from the SSE wrapper's verdict cache instead.

Verdicts within the verdict cache 710 can be associated with lifetime value or TTL value. In an embodiment, when the lifetime value or TTL value expires, the verdict is no longer used and is removed from the verdict cache. The verdicts that are cached are considered valid and are used until the proxy appliance 506 receives or is informed of a signature update by the SSE that provided those verdicts, and thereafter the previous verdicts from that SSE are no longer used so that the SSE will generate new verdicts based on the new signatures for response bodies received after the signatures are updated.

In some implementations, the proxy appliance 506 is configured to stream content to a client at the same time as the content is written to the cache 806. Thus, the first time that a particular response body is received, the content is streamed to the client even though the content is not yet scanned. Thereafter, by using a verdict cache, subsequent requests for that content can be blocked if the verdict indicated that the content was malicious or otherwise undesirable.

As yet another example, even when the first request for the content is made when the content is being streamed to the client while also being sent to the cache 806 for scanning by an SSE 708A, if the SSE returns a verdict that indicates the content should be blocked, and the content has not yet been fully streamed to the client, a portion of the content not yet streamed can be blocked or stopped. For some types of content, such as a .zip file, lacking the tail end of the content effectively renders the .zip file unusable, and thus the client is protected. It may appear to the user that the content was being received without a problem, yet the file as received by the user is unusable without the user knowing what the problem is (e.g., that the proxy appliance 506 determined the content was bad and therefore blocked it). However, with a verdict cache, a subsequent request by another user can result in a better end user experience because the proxy appliance 506 can provide the user with a message indicating that the content was blocked because the content was determined to be spyware, etc.

2.0 Managing Traffic

Much spyware is received at a client over the World Wide Web via the Hypertext Transfer Protocol (HTTP) on standard ports. However, some spyware is received or otherwise operates over non-standard HTTP ports and/or other protocols. A proxy server typically handles HTTP traffic. The traffic monitor 508 as described herein handles all other IP traffic.

In an embodiment, traffic monitor 508 helps a system administrator detect machines in a network that have been infected by spyware. Traffic monitor 508 also helps prevent some unwanted effects of spyware infestations by preventing spyware from sending some or all messages from an infected client to home sites of the spyware ("phone home" activity). The traffic monitor 508 described herein provides basic functionality for monitoring and blocking a subset of IP traffic when the traffic monitor is deployed, such as an inline implementation as an Ethernet-bridge or an Ethernet-tap.

Example features of a traffic monitor 508 can include one or more of the following, depending on the details of a particular implementation:

1. The appliance upon which the traffic monitor is implemented is placed on the ingress/egress link and uses an IP address on that link.

2. The appliance upon which the traffic monitor is implemented sees data when the data is forwarded to the appliance by the router or a tap. The tap/span port may, depending on the installation, receive data from both directions on a single network interface card (NIC) or receive unidirectional data on each of two NICs.

3. Some or all identifying information on the packet being examined is available for reporting, including but not limited to, the source address, destination address, and port. The kernel Internet Protocol Firewall (IPFW) modules log IP addresses; however, syslog entries may be flushed out with information from other sources (e.g. DNS cache) when translated to qlog.

4. The addresses can be supplied by the same source as supplies the broader definitions for the proxy. The frequency of updates depends on the implementation, such as being updated every 24 hours.

5. A log against specific anti-spyware addresses in the traffic monitor database can be used.

6. The user-name is logged when that user-name can be derived from an IP address. Logging a user-name instead of a client IP can be performed in some deployment scenarios, but may be precluded if network address translation (NAT) is performed in a device positioned before the device upon which the traffic monitor is implemented. In some implementations, NAT ability can be included in the proxy appliance 506, so that the proxy appliance can use internal network addresses. Alternatively, some implementations can be configured so that the traffic monitor 508 can watch a span/tap on the INTERNAL interface of a firewall, in addition to running inline. The proxy may have proxy authentication information in some deployments and that information can be "shared" with the kernel for logging.

7. Any session can include blocking a connection to a known bad IP address when the traffic monitor is deployed, such as in an inline deployment, regardless of protocol.

8. The traffic monitor can send TCP resets to known bad IP addresses when on a tap, such as by taking advantage of the IPFW functionality to do so.

9. Simple sharing extensions (SSE) data can be used to block traffic, such as by using direct, non-opaque access to vendor signatures (IPs, URLs, etc.).

10. The traffic monitor can perform reverse domain name service (DNS) lookup. While in some implementations reverse lookups may be done, in other implementations, the primary data for address blocking of addresses is from snooping forward lookups. Reverse lookups can be made to the local cache as recursive full lookups may be too expensive for some implementations. Also, DNS snooping can be provided as an alternative.

11. In some implementations, the traffic monitor logs only IP addresses that are blocked, but other information (e.g. hostnames or source machine) can also be available depending on the deployment mode and the address blocked.

12. A firewall can be used to forward traffic that the proxy can handle to the proxy so that traffic will not be processed by the other filters. This is configurable in that the traffic monitor can be configured to not to list traffic being proxied by the device on proxy ports, or vice versa.

13. In some implementations, the administrator can import or create custom whitelists and blacklists Queries against these whitelists & blacklists typically occur before querying the database 702. Whitelists and blacklists entered by the administrator can be based on domains or IP addresses.

14. UDP traffic can be disrupted by means of ICMP "Host unreachable" packets when used in a judicious manner. The efficacy of this method depends on the operating system of the client, which can be determined via testing. In some implementations, DNS snooping can give enough prior warning to be able to pre-load an infected host's routing table with disruptive entries to stop the spyware from being able to effect a successful connection, even without being "inline".

15. In some implementations, infected hosts can be quarantined into an isolated virtual local area network (VLAN). With sufficient knowledge of switches and other devices an infected host can be connected into an isolated VLAN, given that the host topology is known and that the infrastructure is running on a set of supported switch level devices.

16. Some implementations can include the ability to block or report on DNS hosts, domains, host-port combinations, or domain-port combinations, such as when deployed in a scenario where DNS snooping is functional. For example, the syslog/qlog translation daemon can be part of the trafmon daemon so that it can have access to the cached DNS snooped information.

17. Some implementations can include the ability to modify DNS lookup responses to resolve to a specific honeypot IP address, which is sometimes called diverting or DNS spoofing.

2.1 Deployment Scenarios

The following are examples of possible deployment scenarios for the traffic monitor 508:

1. The device is placed in-line and watches all traffic coming in or out of the client network. It does not appear on the network between the input and output but has an IP address that appears to be coupled in a T arrangement to the link being bridged.

2. The device is placed out of the traffic flow but is connected to the egress router by use of a SPAN port or an Ethernet TAP. Both input and output data are copied to a single NIC and appear interleaved to the device. In some implementations, dropped data may occur, such as in very high bandwidth applications.

3. The device is placed out of the traffic flow but is connected to the egress router by use of a SPAN port or an Ethernet TAP. Input and output data are copied to different NICs on the device. In some implementations, minor timing ambiguities may occur due, but those should affect the traffic monitor. Data should not be dropped as the copy circuit can process all original data.

In one embodiment, the traffic monitor is implemented on top of the FreeBSD IPFW functionality. In some implementations, changes to the FreeBSD kernel networking code can be used for optimization purposes.

2.2 Traffic Monitor Spyware Database

In an embodiment, database 702 comprises a list of known destinations to report on or block. Destinations in the database can be specified as one or more of the following: IP addresses; DNS hostnames and domains; IP ports; combinations of IP address and port; combinations of DNS hosts/domains and ports. The same or different conventions for DNS as used by a mail gateway appliance (MGA) can be used. For example, an entry in database 702 identifying "bad.com" can be interpreted to identify the host bad.com and all sub domains thereof.

Combinations of addresses and ports can be processed using an exception mechanism using the values that can be added to a table entry to trigger the exception.

In an embodiment, database 702 is stored in the appliance configuration "command_manager" format. For example, the format of TABLE 1 below may be used.

TABLE 1

DATABASE FORMAT

```
#IPCFGV2
# Previous line contains magic number: DO NOT CHANGE

# User: system
# Date: 1139614742322553L
# Comments: by me
blacklist = (10,1139614742321586L, "000E0C62AA14-0000000",
"system", {
"yahoo.com" : "log",
"2.3.4.0/24" : "block",
"home.elischer.com" : "log",
"1.2.3.4" : "block",
"ebay.com" : "block",
"elischer.com" : "divert",
"xmirror.us" : "block",
"0-0-domain-starting-at-785.com" : "block",
"0-2u.com" : "block",
})
```

In this example format, the value "my.domain" will match "anything.my.domain" and "my.domain". The values in the list are of the format: "destination":"action", in which "destination" is one of the forms of destination described above (IP, DNS, combo, etc., such as an IP address or domain name), and the "action" can be in one of the forms shown in TABLE 2:

TABLE 2

ACTION FORMAT

<firewall action>
(<firewall action>,<dns action>)

In an embodiment, a firewall action is one of: " "—take the default action as configured by the config variable trafmon.config.tm_default_response; log—merely log/report on the event; block—block packets to/from the given destination; reset—attempt to generate a reset or icmp packet in response to matching the address. In an embodiment, a dns action is one of: " " or missing—use the default as specified in trafmon.dns_snooper.tm_dns_default_response; pass—if the destination is has a DNS name in let it through but note the contents in the grown blacklist with the appropriate firewall action; drop—if the destination is has a DNS name in it just drop any DNS responses that match; note the address in the grown blacklist with the appropriate firewall action; divert—if the destination is has a DNS name in it, resolve the DNS record as the honeypot IP; note the address in the grown blacklist with the appropriate firewall action.

Diversion means that the address returned to the initiating DNS requestor is modified to replace the real address with an address of the administrator's choosing, allowing the easy identification of infected machines requesting that information. As an example, assume an entry is "badguys.com": ("block","divert"). This indicates that the DNS replies should be spoofed to a diversion address, and that if any packets come for this address, they should be blocked.

DNS relates keywords ("pass", "drop", "divert") are orthogonal to firewall keywords ("log", "block", "reset") and the action field may contain one of each set.

2.3 IPFW, DNS, DNS Snooping, Blocking, and Spoofing

In some implementations, the traffic monitor 508 includes a firewall rule manager 704. The firewall rule manager 704 reads information from database 702 and installs or uninstalls IPFW rules as required. Entries from the configured blacklist, which are in IP address form, are directly added to a firewall that may be separate from proxy appliance 506 or incorporated in it. In an embodiment, the IPFW functionality can block or report TCP connections or UDP datagrams based on IP address, port, or IP address and port together. In some implementations, only addresses can be implemented using the most efficient 'table' feature of IPFW.

Because IPFW generally does not natively understand DNS names, then in order to handle DNS names in the spyware database, one or more of the following options can be used:

1. For individual host names, perform reverse DNS lookups. However, in some cases, these lookups are not accurate and unreliable, and therefore, in those instances, this choice may not available/supported because of this reason.

2. For domains, attempt to discover all names in the domain and reverse all of them. However, in some cases, this is both difficult and unreliable, and therefore, this option may not be supported.

3. DNS snooping.
4. DNS blocking.
5. DNS spoofing.

DNS snooping is the ability for the proxy appliance 506 to inspect all DNS transactions that go from devices in the internal network that is protected by the appliance to devices that are external to the appliance. Given the ability to see all DNS lookups, the appliance can track all forward lookups for given host or domain names in its spyware database. This will enable the appliance to know the IP addresses that were resolved from any host or inside any domain that it should report or track on. This technique can include the following considerations:

1. Lookups that the appliance does not snoop can yield IP transactions that the appliance won't report or block. Such lookups could occur before the appliance is installed or at any time when the DNS snooper is disabled (for example, previous to the install, during an upgrade, during a time when a bridge is bypassed, and so on). As a result, the DNS caches in the organization can be flushed after the appliance is installed to allow the appliance to see all DNS queries.

2. Multiple names may resolve to the same IP address. It's possible that a host in a bad domain could map to an otherwise normally good IP address. For example, foo.bad-guy.com could actually map to a well-known "good" IP address. If the appliance is to report or block on bad-guy.com, then that may result in reporting or blocking all traffic to an otherwise good IP. Of course, one would also see the good lookup, too.

DNS blocking is like DNS snooping but, when deployed inline only, the appliance can simply block DNS responses to bad hostnames or names in bad domains.

DNS spoofing is like DNS snooping but, when deployed inline only, the appliance can modify DNS responses to point bad hostnames or names in bad domains to a specific quarantine IP address.

In some implementations, whether to block or drop or spoof (divert) is decided by the action associated with the entries that matched. There is also a system-wide default.

2.4 IP Blocking

When requested to perform IP blocking, the traffic monitor 508 installs in the firewall IPFW rules to block matching traffic. When not inline, the traffic monitor installs IPFW rules that will result in sending resets to TCP and/or UDP connections that are intended to be blocked.

DNS name form entries in the configured blacklist which match a snooped DNS query, and have an action of "block", can cause the IP address returned, to be added to a "grown blacklist" which is used in addition to the IP addresses extracted from the configured blacklist Grown entries have TTL (time to live) values associated with them and are purged from the blacklist after some time derived from the TTL. The TTL used for the blacklist is derived from the TTL on the DNS response. That value can also be found in the log files.

In an embodiment, a static whitelist can be supplied by the administrator. The dynamic or grown whitelist can be populated with IP addresses generated from whitelist entries that have DNS hits. When the address is given in numeric form, or blocking is selected as the action, the examination of transfers can be performed on a "per session" basis. Once a session is accepted, the "keep_state" option of IPFW can be used to ensure that the session does not contribute to any further system load.

Embodiments have been found to offer high performance. In an embodiment, a pass-through rate of about 880 Mbit/sec can be obtained (e.g., 88% of a 1 Gb Ethernet connection). The ability to check at least 70,000 session startups per second has been obtained along with export for further logging or processing, about 65,000 packets per second. Such testing results are based on the following: check each packet against a table of 128000 addresses; copy each packet that matches the table (in this test all packets match); send the copy to a user process; the user process outputs a log entry indicating it received the packet; the log entry is transmitted to another machine. Based on this testing regime, a throughput of about 109,000 KB (109 MB) per second is obtained while filtering the 70,000 packets per second, where all packets were copied and logged.

In some implementations, the filters may be slightly more expensive; however, not all packets need checking in a real environment, as sessions already approved would be bridged with no extra checking, and only startup packets for new sessions would be run to full filtering. For DNS snooping, when tested on an unloaded system, about 0.5 mSec may be added to the response time for a DNS lookup.

2.5 Logging, Reporting and Alerts

In an embodiment, traffic monitor 508 logs events that enable generating reports about outbound traffic directed to the list of known destinations. Kernel modules log via the system logging facility and the output is translated as needed for use by the qlog utility program. Added information from the DNS cache or other sources can be included. As an example of logging, assume an inline/inline mode and that a user tries to access "find4good.com," which is a known bad site. TABLE 3 presents an example of where entries have been added to the firewall:

TABLE 3

LOG OF ADDING ENTRIES TO FIREWALL fennel:rjulian 129] pwd
/var/log/godspeed
fennel:rjulian 129] cat trafmonlogs/tmon_misc.current
Wed Mar 22 21:44:07 2006 Info: Begin Logfile
Wed Mar 22 21:44:07 2006 Info: Version: 1.0.0-119 SN: 001143EEC72B-GK7GB71
Wed Mar 22 21:44:07 2006 Info: Time offset from UTC: 0 seconds
Thu Mar 23 00: 07:10 2006 Info: Intercepted dns reply for find4good.com.
Thu Mar 23 00:07:10 2006 Info: Address 195.225.177.26 discovered for find4good.com added to firewall.
Thu Mar 23 00:07:20 2006 Info: Intercepted dns reply for find4good.com.

To confirm that this bad site is added to the firewall:
fennel:rjulian 131] ipfw table 6 list
195.225.177.26

In one example implementation, there are 4 pairs of tables in use: tables 2 and 3 are the exemption list, loaded from trafmon.whitelist/data.cfg; tables 4 and 5 are the static blocking list, loaded from trafmon.blacklist/data.cfg; tables 6 and 7 are the dynamic blocking list, created from DNS hits on the blacklist; tables 8 and 9 are the dynamic whitelist, created from DNS hits on the white (exemption) list. The four tables are used at different parts of the firewall. For example, table 2 is at 1100, its alter-ego, table 3, is at 1110; table 8 is at 1140, its alter-ego, table 9, is at 1150; table 4 is at 1910, its alter-ego, table 5, is at 1930; table 6 is at 1950, its alter-ego, table 7, is at 1970.

TABLE 4 provides examples of whitelist rules:

TABLE 4

EXAMPLE WHITELIST RULES 01110 allow ip from any to table(3)
01111 allow ip from table(3) to any Examples of the blacklist rules, which can appear as a block, are provided in TABLE 5:

TABLE 5

EXAMPLE BLACKLIST RULES 01950 skipto 1969 tcp from any to any dst-port 80,3128 in
01951 skipto 1960 ip from any to table(6,1)
01952 skipto 1960 ip from table(6,1) to any
01953 skipto 1965 ip from any to table(6,2)
01954 skipto 1965 ip from table(6,2) to any
01955 skipto 1967 ip from any to table(6,3)
01956 skipto 1967 ip from table(6,3) to any
01957 skipto 1960 ip from any to table(6)

TABLE 5-continued

EXAMPLE BLACKLIST RULES 01958 skipto 1960 iP from table(6) to any
01959 skipto 1970 ip from any to any
01960 skipto 1963 tcp from any to any
01961 count log ip from any to any
01962 reject ip from any to any keep-state
01963 count log ip from any to any
01964 reset ip from any to any keep-state
01965 count log ip from any to any
01966 deny ip from any to any keep-state
01967 count log ip from any to any
01968 allow ip from any to any keep-state Depending on a response mode of the traffic monitor 508, rules can vary, including that some rules may disappear or change. Some rules may not be used in some modes and may sometimes be removed. TABLE 6 is an example.

TABLE 6

EXAMPLE OF MODIFYING RULES 01950 skipto 1969 tcp from any to any dst-port 80,3128 in
01951 skipto 1960 ip from any to table(6)
01952 skipto 1960 ip from table(6) to any
01959 skipto 1970 ip from any to any
01960 skipto 1963 tcp from any to any
01961 count log ip from any to any
01962 reject ip from any to any keep-state
01963 count log ip from any to any
01964 reset ip from any to any keep-state
01965 count log ip from any to any
01966 deny ip from any to any keep-state
01967 count log ip from any to any
01968 allow ip from any to any keep-state The first block is with tm_response=" " The second block is with tm_response="reset" If tm_response had been "log", lines 1951 and 1952 would have skipped to line 1967, but if it had been "block" they would have pointed to 1965. TABLE 7 is an example to see the effect of the rule after something is blocked.

TABLE 7

EXAMPLE EFFECT OF RULES AFTER BLOCKING fennel:rjulian 132] cat /var/log/godspeed/ipfw.log
Mar 23 00:07:20 /kernel: ipfw: 1963 Count TCP 172.28.5.66.56173
195.225.177.26:23 in via em2
Mar 23 00:07:26 last message repeated 2 times
fennel:rjulian 133]

In inline mode, rule 1963 is a TCP packet being blocked (a TCP reset was sent) and rule 1961 means another protocol (e.g. UDP) was blocked and an icmp "host unreachable" packet was sent. The rule that logs the message is the rule immediately preceding the rule that actually blocks or allows the packet.

The part of the log message, "in via em2" indicates it came from the inside. This is with a shared bridge. However, with separate bridges, it would be different, such as follows: em4. So em0 (on old cards), 2 and 4 mean coming from the inside and em1 (on old cards), em3 and em5 indicate coming from the outside. As another example, if the implementation is "optimizing" by doing both bridges at once, there would be still different log messages.

TABLE 8 has examples of other possible log messages.

TABLE 8

EXAMPLE OTHER LOG MESSAGES

Intercepted dns reply for $domain.
dns reply for $domain allowed by rules or whitelist.
Intercepted dns alias reply for $domain.
Address $addr discovered for $domain added to firewall blacklist.
Address $addr for $domain timed out of firewall blacklist.
Address $addr for $domain removed from firewall blacklist.
Address $addr discovered for $domain, added to firewall whitelist.
Address $addr for $domain timed out of firewall whitelist.
Address $addr for $domain removed from firewall whitelist.

2.6 Configuration

In one implementation, traffic monitor 508 is configured with the following information describing how the traffic monitor and proxy appliance are deployed in a network topology: Ethernet bridge and interfaces for bridge; tap and interface if tap id duplex or interfaces if taps are simplex (and which is in and which is out); ports on which the proxy is listening for http and ftp (typically 80, 443, 21) as configured for the proxy; whether the traffic monitor should also examine those ports; dns port (53) (treated specially); any address specified in a user supplied whitelist; whether DNS snooping is turned on; whether DNS blocking is turned on; whether DNS spoofing is turned on and if so, to what IP address; whether to block or just log suspicious activity.

In some implementations, the administrator may want to include other well-known ports like 25 (SMTP) in the whitelist. This information can be included in a configuration file, such as the example of TABLE 9:

TABLE 9

EXAMPLE CONFIGURATION FILE

```
#IPCFGV2
proxrules_enable = (1, 0, " ", " ", "yes")
blacklist_enable = (1, 0, " ", " ", "yes")
exemptlist_enable = (1, 0, " ", " ", "yes")
DNS_divertlist_enable = (1, 0, " ", " ", "yes")
# lines marked [*] will be removed soon. Do not use.
bridge_inner = (1, 0, " ", " ", "em1") <--------- [*]
bridge_outer = (1, 0, " ", " ", "em0") <--------- [*]
tm_inner = (1, 0, " ", " ", "em2") <--------- [*]
tm_outer = (1, 0, " ", " ", "em3") <--------- [*]
# is the traffic monitor function actually allowed to do anything ?
# This does not stop the TM from forwarding packets to the
proxy if needed.
tm_enabled = (1, 0, " ", " ", "no")
# Mode for the TM section.
# can be "Inline1", "Inline2", "Tap1", "Tap2"
tm_mode = (1, 0, " ", " ", "Inline1")
# just log activity or block or reset
# can be " ", "log", "block" or "reset"
# This over-rides actions specified by the rules if not set to " ".
tm_response = (1, 0, " ", " ", "log")
# What to do if tm_ response is not set and the address doesn't
give an action.
# if set to an unknown value it defaults to "log".
tm_default_response = (1, 0, " ", " ", "log")
# don't examine ports the proxy is doing
tm_skip_proxy_ports = (1, 0, " ", " ", "yes")
```

TABLE 10 has examples of other sources of configuration information.

TABLE 10

EXAMPLE OTHER SOURCES OF
CONFIGURATION INFORMATION $GODSPEED_ROOT/config/trafmon.whitelist/data.cfg
$GODSPEED_ROOT/config/trafmon.blacklist/data.cfg

TABLE 10-continued

EXAMPLE OTHER SOURCES OF CONFIGURATION INFORMATION

```
(see above for sample data)
$GODSPEED_ROOT/config/trafmon.grown_whitelist/data.cfg
$GODSPEED_ROOT/config/trafmon.grown_blacklist/data.cfg
$GODSPEED_ROOT/config/trafmon.dnssnooper/data.cfg
    # Address to use for DNS spoofing.
    honeypot_IP = (1, 0, " ", " ", "127.0.0.2")
    # what do do if we match a rule..
    # this over-rides the rule's own suggestion
    # may be " ", "pass", "drop", "divert"
    # " " allows the rule to make up its own mind
    tm_dns_response = (1, 0, " ", " ", "pass")
    # What to do if the rule doesn't specify an action.
    tm_dns_default_response = (1, 0, " ", " ", "pass")
$GODSPEED_ROOT/config/prox.etc/data.cfg
$GODSPEED_ROOT/config/system.network/data.cfg
```

As an example, the interface UI and interface controller supply the interface information.

2.7 Other Features and Examples

The following section describes some additional features and examples, some, all, or none of which may be included in a particular implementation.

The traffic monitor 508 can include periodic updates of the database 702 to include new spyware domain information, which can be provided by the provider of the proxy, the customer, a third party, or any other suitable source.

A check can be made to determine if the administrator of the proxy has the nets backwards in bridge mode.

The traffic monitor 508 can be exposed to users using a Web interface and/or a command line interface (CLI).

Packets can be examined for content and sessions reconstructed to facilitate tracking information and creating reports based on the specific protocols being used over which ports.

Packet inspection can be performed and streams reassembled, along with disabling or proactively isolating infected machines.

The traffic monitor 508 can run inline without requiring an extra IP address, or conversely, an extra IP address can be used with the inline configuration. An additional link for control purposes can be provided. In some implementations, the two interfaces used for performing transparent filtering are not used for normal IP processing.

In one example, the proxy appliance 506 is placed in-line and watches all traffic coming in or out of the client network. The device does not appear as a device on the path, and there is no IP address on the bridge. However, in some implementations, an address can be provided, such as the NULL address for the range, although that may not be guaranteed to be free. When placing the device in-line, ARP code entries may only be created when there is an interface with an address on that net. The proxy code can also be running on the device in "pass through" mode, using transparent proxy techniques. Control is via another NIC.

When a NATed stream is used, some implementations can run the traffic monitor with a sensor on the pre-NAT input stream to detect which device is making the requests. Thus, the traffic is seen twice, blocking on the second but logging information gained from the first. Blocking purely on ports can be part of a particular implementation. UDP IPFW forwarding and spoofing can also be implemented.

3.0 Filtering Responses

One approach for detecting and eliminating spyware is scanning the response body before sending it to the client. In some approaches, such scanning is performed by a third-party Spyware Scanning Engine (SSE), running as a separate process.

3.1 Design Outline

According to an embodiment, a proxy appliance 506 comprises a high performance cache configured for moving data through the proxy and to the client as quickly as possible. An approach for filtering HTTP responses comprises examining the data and blocking unwanted data, such as data identified as spyware.

In an embodiment, a response filter is integrated with an anti-spyware system or scanning engine, and optionally with anti-virus and other protective mechanisms. In an embodiment, updates to the spyware scanning engine are received without an update to the entire platform. In an embodiment, some tags can be stripped, such as <object> and <embed> tags for some CLS Ids and <script> tags. Users can also be quarantined.

Figure 9:
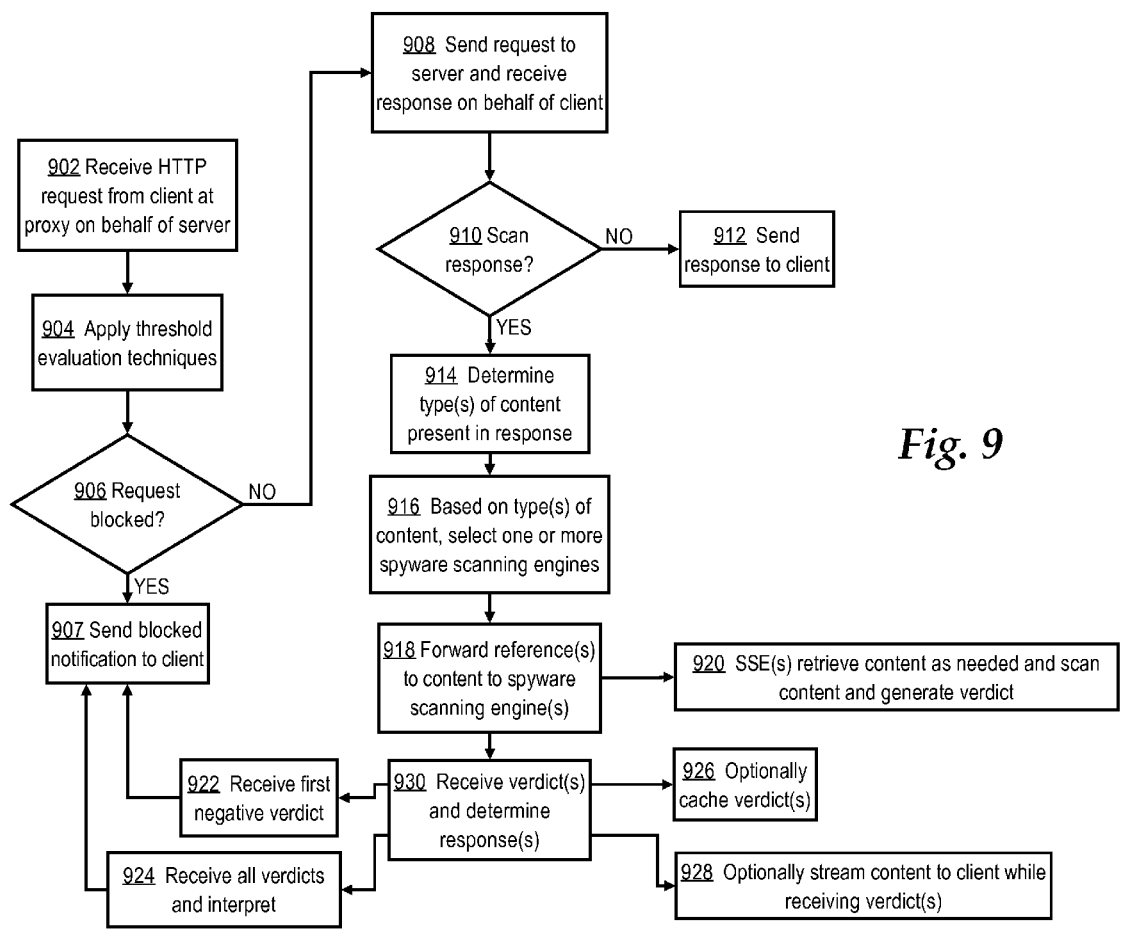
FIG. 9 illustrates a process of evaluating responses from network resources for spyware and other threats.

FIG. 9 is a flow diagram of an approach for filtering an HTTP response in a data processing apparatus. In one example of operation, in step 902 an HTTP request is received. For example, a client computer in an enterprise network enters a URL in a Web browser that has been configured to communicate with proxy appliance 506, the browser packages the URL in an HTTP request, and the request is received at the proxy appliance.

At step 904, one or more threshold techniques are applied to the request, such as applying a web reputation filter, which may or may not result in blocking the request. If the request is blocked, as tested at step 906, then a notification of blocking is sent to the client. For example, the proxy appliance 506 can return an HTML document to the client indicating that the request cannot be transmitted and optionally providing other information.

If the request is not blocked, then control transfers to step 908 in which the request is sent to the server or network resource identified in the URL and a response is received on behalf of the client. Thus, the server response is received at the proxy appliance 506 rather than given directly to the client. In an embodiment, the core proxy 712 saves the content of the response to the content cache 806.

In step 910, a test is performed to determine whether the response should be scanned. If the content is not not to be scanned—for example, if the server is listed in a whitelist of trusted network resources, or has a good reputation—then the response is sent to the client in step 912 and the functions of FIG. 9 are complete at that point. If the content is to be scanned, then at step 914, the response is checked to determine what type of content is included in the response. In one embodiment, step 914 comprises scanning the first portion of the content and identifying one or more content types.

In step 916, based on one or more content type(s) that are identified, one or more spyware scanning engines are selected to scan the content. Selecting in step 916 can be based on a list of the SSEs and the content types that each SSE can scan or is best suited to scan. In step 918, one or more references to the content are forwarded to the selected spyware scanning engines. For example, the SSE API 802 forwards a file handle for the file to one or more SSE wrappers 804A, 804B, 804C for the selected SSEs.

In step 920, the selected one or more SSEs retrieve content of the response as needed, scan the content according to logic within each of the SSEs, and generate a result or verdict indicating whether the content contains spyware or other threats in the judgment of that SSE. In an embodiment, each SSE wrapper interacts with the SSE, such as through remote procedure calls (RPCs) to facilitate retrieving some of the file or the entire file from the content cache 806 based on the file handle and supplying the SSE API with the verdict from the SSE's scan. The techniques described above in section 2.0 can be used to obtain content, scan and generate verdicts.

In step 930, one or more verdicts are received from the SSEs and one or more responsive actions are determined. In one embodiment, upon receiving the first negative verdict from any of multiple selected spyware engines, as shown in step 922, the response is identified as containing spam and a blockage notification is sent to the client at step 907. In another embodiment, all verdicts are received from all selected SSEs, the verdicts are interpreted and then a decision is made whether to block the response.

At step 926, optionally in some embodiments the verdicts returned by the SSEs are cached in the verdict cache 710 (FIG. 7) as described above in section 2.0. At step 928, optionally in some implementations the content is streamed to a client at the same time as the content is stored in the cache. Thus, the first time that a particular response body is received, the content is streamed to the client even though the content is not yet scanned. Thereafter, by using a verdict cache, subsequent requests for that content can be blocked if the verdict indicated that the content was malicious or otherwise undesirable.

Figure 10:
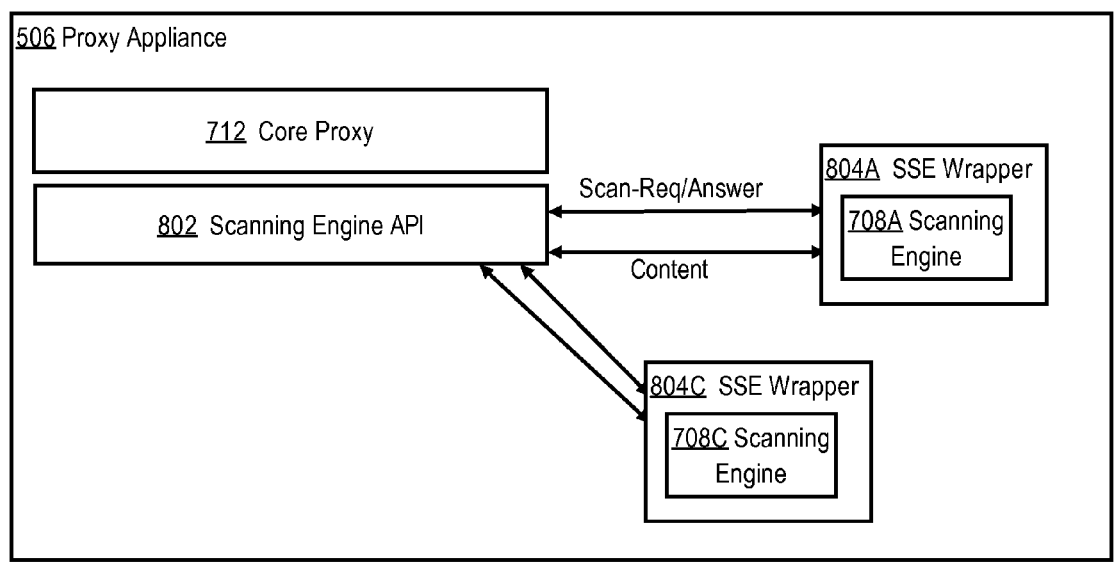
FIG. 10 illustrates a block diagram of message flows in one implementation.

FIG. 10 is a block diagram of message flows in one implementation. In an embodiment, when the core proxy 712 scans a response body, the core proxy calls a function in the SSE API 802. The API 802 is responsible for communicating with the various SSE Engines 708A, 708C and for deciding which SSE(s) should scan this object. The core proxy 712 then sends a Scan Request message over a Unix domain socket for the engines that it has chosen. The selected SSE 708A, 708C sends requests to the core proxy 712 over a separate Unix domain socket for the contents of the object and the core proxy returns the contents within the requested range. The core proxy 712 continues to read the object from the server, answer the requests of an SSE 708A, 708C and store the object on disk.

When the SSE 708A, 708C has reached a decision, it sends a Scan Response message back to the core proxy 712 with its verdict, indicating that the object is spyware or unknown. The SSE API 802 aggregates the verdicts from multiple SSE(s) 708A, 708C and sends the answer to the core proxy 712. If the object is not spyware and assuming that the other ACL rules allow it, the core proxy 712 can then send the response to the client.

In one implementation, the API 802 aggregates the verdicts based on the first positive response. That is, when one SSE 708A identifies an object as spyware, the object is considered to be spyware and the API 802 terminates any other scans. An object is deemed clean only if all engines identify it as clean or unknown. The ACL rules determine what objects are scanned, and therefore rules can scan every object, and or rules can scan nothing.

In this implementation, the core proxy 712 and the SSE(s) 708A, 708C are separate Unix processes and communicate over Unix domain sockets using suitable ScanRequest and ScanResponse message formats. The format for messages between the proxy 712 and the SSE(s) 708A, 708C is not critical and any suitable message format can be used.

3.2 Providing Response Content to SSE

In an embodiment, core proxy 712 sends the contents of the response body to the SSE 708A, 708C as described above. In one embodiment, the core proxy 712 and each SSE 708A, 708C communicate over two Unix domain sockets (two sockets per SSE). The core proxy 712 is the server side for both sockets and listens on the sockets, and each SSE 708A, 708C is a client that connects to the socket. The core proxy 712 uses unique file names for each socket. In an embodiment, an SSE 708A sends a binary message through the socket, requesting a small piece of the file. In an embodiment, a request message comprises six fields denoted rm_magic; rm_version; rm_proxId; rm_sseId; rm_start; rm_length; and rm_flags. In an embodiment, the field "rm_magic" is a magic number used as a sanity check that this is the start of a valid message. The field "rm_proxId" is an index inside the core proxy 712 that identifies the response object. The core proxy 712 sends this value as the Id field to the SSE (over the other socket), and this value is meaningful inside the core proxy 712.

The field "rm_sseId" identifies the object inside the SSE. The field rm_start is the byte offset (starting at 0) of the beginning of the requested region. The field rm_length is the length of the requested region in bytes. The field "rm_length" is positive and should not exceed an agreed upon constant, because if rm_length is too large, the Proxy may silently lower the value and not treat it as an error. The field "rm_flags" can indicate end of file, an error condition or a request to terminate the scan. For example, when one SSE returns a verdict of spyware, the core proxy 712 will send a RangeMessage with the SSE_KILL flag to all other SSE(s) scanning the same object.

The core proxy 712 returns the same RangeMessage structure as a header, followed by rm_length bytes of content. The first four values of RangeMessage should be identical to the request, but rm_length may be smaller, and it may set some flags. The core proxy 712 can attempt to fulfill as much of the request as is convenient, but it may return a shorter length than requested. For example, if the core proxy 712 has some of the data in memory, it may prefer to send that much data now, rather than to wait on the server for the full amount. But if the core proxy 712 has to fetch the data from disk, then it can fetch the full amount.

Invalid requests, for example, ones with an invalid rm_proxId value, can be logged. A request with an invalid rm_magic field implies that the core proxy 712 and SSE 708A, 708C have lost synchronization. If this happens, the core proxy 712 can close the socket and wait for the SSE 708A, 708C to reconnect. This also is logged.

Although this example design allows for random access requests, sequential access can be used to improve performance of the core proxy 712. Thus, the third-party SSE(s) 708A, 708C can be requested to use sequential access when possible.

3.3 ACL Profiles

In one embodiment, there are three ACL profiles relevant to response scanning: a mimetype ACL profile, a category ACL profile, and a size ACL profile. In an embodiment, an ACL profile denoted respbody_mimetype is the result of the approximate MIME message type of the message, and represents the type and subtype of the file, for example, image/gif, text/html, application/x-dosexec, etc. In an embodiment, an ACL profile denoted respbody_category is the verdict from the response body scan and can comprise a value of 0=unknown (clean), 1=time out, 2=error, 3=generic spyware, and >=4 are other types of spyware. In an embodiment, an ACL profile denoted respbody_size is the size of the complete response body, in bytes.

3.4 Caching File System

In an embodiment, while content is being scanned, the content can be temporarily stored on disk, such as in content cache 806 (FIG. 8) by the core proxy 712 to facilitate the filtering of HTTP responses. In an embodiment, content cache 806 comprises a caching file system (CFS) as further described herein.

In an embodiment, the CFS herein is not a traditional file system like the Unix File System or NTFS. The CFS does not hold the master copy of any file, because the master copy is at the origin server. The CFS is allowed to delete any file at any time because it can recover that file from the origin server. Similarly, the CFS does not run out of space because it can overwrite the next item on disk to accommodate a new file. Also, the CFS has different access patterns and uses a different layout strategy than a traditional file system. The CFS treats the disk as a large, linear array and writes files in contiguous segments on the disk in a sequential sweep of the disk. When the CFS reaches the end of the disk, the CFS starts over at the beginning of the disk. The CFS does not use an LRU or other replacement strategy for deciding what to remove from the disk. When the sweep process reaches some position on the disk, any data present at that position is removed. Using a linear sweep approach helps minimize disk head movements, and can be optimized for sequential access, thereby improving performance of the core proxy 712.

In an embodiment, disk storage is associated with content cache 806 to store cacheable content from the origin server. An object is cacheable in the HTTP sense for it to be stored on disk. Further, the entire object is generally stored in a contiguous region on the disk. In an embodiment, each object is small enough to fit in main memory, or the size of the object is known in advance using a Content-Length header. Large objects whose size is not known in advance are generally not cached.

For response filtering, the disk serves two purposes. In addition to storing cacheable content, the response filtering techniques described herein also use the disk to store objects that need response body scanning but are too large to fit entirely in memory. Thus, some objects are saved on disk that are not cacheable in the HTTP sense when the ACL rules require a full scan and the object is too large to fit into memory. In an embodiment, the response filtering engine always stores such objects even the size of the object is not known in advance.

In an embodiment, files with a known size, either with a Content-Length header or small enough to fit entirely in memory, are stored in a contiguous segment on disk. In an embodiment, the files in the content cache 806 are organized as a PFP+Server/URI, followed by one or more Headers, followed by a content Body. The Permanent File Prologue (PFP) contains information about the file such as the length of the headers and body and cacheable status. Following the PFP are character strings for the server name and the URI for this file. The Headers and Body are provided next in a contiguous segment. The core proxy 712 can be configured so that the PFP, Server/URI strings and Headers all fit within the first chunk of this segment. When reading a file from disk, the Proxy can read the first disk chunk and expect to find all of the Headers within this first chunk.

In one embodiment, the Permanent File Prologue comprises information representing a first byte position in the body for the PFP plus all following strings, content length, port number, server name length, URI length, and dates needed for age and staleness processing; flags about cacheability; a converted value of LMT field; a byte position of a last-modified-time field after the start of the server response; a byte position of an Expires field after the start of the server response (saved aside for later refreshes); a hash value of Cache-Control field; and a tag value.

In an embodiment, large responses, with a Content-Length field and value exceeding the size that can fit into memory are written to disk as they are written to the client. Small responses, or those with no Content-Length field that can be cached only if they are small, are saved in memory as they arrive from the server. When the response is small, it can be scanned for embedded links, and saved in memory until the client causes the proxy to fetch the targets of these embedded links. By delaying the writing of small responses until the embedded targets are fetched, the proxy can write all the related responses to disk together, and a request for a cached response can let the proxy fetch correlated responses from disk before the client requests them, allowing faster responses.

In an embodiment, files too large to fit in memory in one segment can be stored in multiple slabs having a size equal to the amount of main memory, some of which have an extra chunk for pointers to more slabs. In an embodiment, such data files comprise Pointers, PFP+Server/URI, Headers, and Body. The Pointers field is a block containing fields that represent slab disk addresses. In an embodiment, the first 1024 fields are addresses of ordinary 256 k slabs storing response data, which allows 260M objects to be cached, just as the contiguous format allows. The last few fields point to slabs augmented with pointer chunks.

In an embodiment, the core proxy 712 stores disk directory information in memory, typically at all times. In order to preserve cached content across proxy restarts, core proxy 712 writes a snapshot of the directory to certain disk tracks every few seconds. The core proxy 712 operates based on the fact that, from the start address of an object on disk, and its size, the end of the object can be found because the object is stored in a single interval. By considering every directory entry on startup, the proxy can determine where it can write new responses without corrupting data indexed by the data from the persistent store.

In an embodiment, the persistent store is updated with records of large responses when the next small response was recorded. Upon a restart of core proxy 712, the core proxy is able to trust end-of-cached-response positions calculated for small objects. If a large object is logged to the persistent store only when a small object that follows it is logged after it, then the risk of corrupting large objects by the caching of new responses can be reduced.

In one implementation, content cache 806 uses small and large segment sizes of 256K and 2 Meg beginning with 16 small segments, and a maximum pointer block size of 4K (1024 disk block addresses of 4 bytes each). However, in other implementations, these parameters may be modified. For example, for Maximum File Size, an example implementation uses a single block of pointers (disk block addresses) with maximum size 4K. At 4 bytes per pointer and a large segment size of 2 Meg, this allows for roughly 1,000 pointers and a maximum file size of a little under 2 Gig. There is a small (20 byte) header at the beginning of the 4K block, leaving room for slightly less than 1024 pointers.

Random access to data in content cache 806 may be supported using a single block of pointers of modest size (maximum 4K per file), so that any range of bytes in a file can be referenced. Although this implementation allows for random access, the SSE(s) can still be able to scan a file sequentially.

Fragmentation approaches may be implemented in content cache 806. Since space on disk should be reserved for a full segment before finishing writing to it, the last segment is only partially filled. This leads to a maximum amount of wasted space of 256K per file for files smaller than 4 Meg, or a maximum of 2 Meg for files larger than 4 Meg. Files smaller than 256K have no wasted space. Proportionately, in the worst case for files of exactly the wrong size, this is 50% for size 256K plus 1 byte, or 33% for size 4 Meg plus 1 byte, though in practice, this is usually be much less.

Memory usage may be adjusted. In an embodiment, several large files that span a 300 Gig disk, all active and in memory at the same time, would consume 600K bytes of pointers for 2 Meg segment sizes. If all of the files are smaller than 4 Meg and thus used 256K size segments, then the maximum pointer memory would be 4.8 Meg, but that would require 75,000 simultaneously active files. Actually, for 4,000 active files and a 300 Gig disk, the pointer memory does not exceed 64 bytes per file for small segment pointers, so 256K total, plus 600K total in large segment pointers for a grand total of 856K, which is reasonable.

Some SSE(s) may not accept chunked transfer encoding, so the core proxy 712 can de-chunk objects in this format before sending them to the SSE. The de-chunked object is shorter than the chunked object, so it is possible to de-chunk an object "in place" by shifting the data inside its data chunk. The core proxy 712 can maintain state information with the data chunk to indicate where the chunked and unchunked pieces begin and end.

Content encoding involves content that is compressed or processed using file formats such as GZIP or ZIP. Depending on the capabilities of the SSE(s), the core proxy 712 unzips or decompresses the response body before sending it to the SSE(s), if necessary. Decompressing objects and scanning the compressed contents can be done in the SSE(s) or their wrappers.

Containers involve content that is inside zip or tar files. Depending on the capabilities of the SSE(s), the core proxy 712 can unpack these files before sending them to the SSE(s), if necessary. Unpacking and scanning containers can be done in the SSE(s) or their wrappers.

MIME file types involve examining at the first few bytes of a file for magic numbers and possibly at the file extension (.exe, .gif, if available) to determine the type of the file. The core proxy 712 can use the file type to determine if a full scan is needed and if so, which SSE(s) should perform the scan.

The core proxy 712 can add a new phase for ACL rules, the response body prefix phase, and a new profile, respbody_mimetype profile, based on file type. This approach allows the ACL rules to determine what objects should be scanned based on file type and other profiles. For example, this file type for that group should be scanned but this other file type for some other group should not, etc.

MIME type names as used in the libmagic third party software library and as returned by the "file-i" program can be used for both the respbody_mimetype profile and for the spyware scanning engines. For example, TABLE 11 presents MIME example MIME types corresponding to some common file extensions.

TABLE 11

EXAMPLE MIME TYPES

| File Extension | Mime Type |
|---|---|
| .exe | application/x-dosexec |
| .dll | application/x-dosexec |
| .doc | application/msword |
| .pdf | application/pdf |
| .gif | image/gif |
| .jpg | image/jpeg |
| .zip | application/x-zip |
| .gz | application/x-gzip |
| .html | text/html |
| other | application/octet-stream |

For responses with Content-Encoding: gzip (and optionally deflate), the MIME type of the original (uncompressed) content can be computed, for example, by collecting the first few hundred bytes of the encoded response, using zlilb to uncompress it, and then using libmagic to determine the mime type of the original content.

In one embodiment, assume there is only one SSE, access is strictly sequential, the data is streamed to the client during the scan, and the connection is prematurely closed if the scan is positive. This implementation involves the following:

1. Add an ACL profile for initiating response scanning.
2. Add an ACL profile for response body length.
3. Add the socket interface between the core proxy 712 (SSE API) and the SSE/wrapper for providing response content from the core proxy 712 to the SSE.
4. Add the FakeFileName and ScanResponse messages between the core proxy 712 and the SSE/wrapper.

In an alternative implementation, the following features may be provided:

1. In-place de-chunking of chunked transfer encoding. This allows scanning objects that arrive from a server in chunked transfer format.
2. Support for the Caching File System (CFS). This allows storing arbitrary objects while they are being scanned so that they do not need to be streamed to the client during the scan.
3. Keep the client active during the scan, such as for example, by using patience pages or redirection.
4. A function similar to the Unix file (1) command is used to identify file type based on the first few bytes (~1024) of an object.
5. An ACL profile expresses what to do with different file types.
6. The SSE API of the core proxy 712 can support multiple SSE(s), both for deciding what subset of the SSE(s) should scan an object and aggregating their results. The Spy Config Table can indicate which SSE to use based on the file type and web reputation (WBRS) score.
7. The SSE API includes timeouts of a scan.
8. The data files for the SSE(s) can be updated.
9. Uncompressing objects before scanning them, if the SSE(s) cannot perform decompression or when the core proxy 712 should perform decompression instead of the SSE(s).
10. Unpacking containers before scanning their contents, if the SSE(s) cannot do this themselves or when the Proxy should do this instead of the SSE(s).

In one implementation, the configuration for response scanning comes from two configuration files, although a number of tunable variables may be limited. First, an ACL rules file initiates scanning and determines what responses are scanned and specifies how to treat the various file types. Second, a Spy Config Table describes each of the SSE(s). This includes the name of the sockets for that SSE and the file types that it knows how to scan.

In an embodiment, one configuration variable is denoted maxResponseScanSize and specifies the size of the largest response that will be stored and scanned. For objects larger than this size, the scan is abandoned and the object is streamed to the Client. A default value, such as 256 Meg, can be used. Other config variables related to response scanning are described below under the heading "Anti-Spyware Integration."

The following section describes some additional features and examples, some, all, or none of which may be included in a particular implementation or embodiment.

For response bodies that need to be scanned, the implementation can be configured to delay sending data to the client until the entire body is scanned, the data can be streamed to the client and scanned at the same time.

For chunked transfer, de-chunking can be used for either all response, or for only those responses that need response scanning. For example, everything can be de-chunked and stored unchunked. Note that the data can be rechunked when sending to the client.

Different configuration options can be specified by one or more tables/rules, such as one or more of the following: the spy configuration table and the ACL rules.

A file_type can be handled in a number of ways, such as a profile, in the Spy Config Table, or a combination of both.

The zlib(3) compression library can be used for decompressing content inside the Proxy. The zlib(3) library works incrementally, and therefore by not uncompressing a large file all at one, a performance bottleneck is avoided.

The main cache (e.g., disk and/or memory) can be cleared by flushing the directory information that helps the proxy find the location on disk of particular cached content. Response scans in progress (and, without response scanning, cache-hit transactions in progress) are safe from this because the transaction record in memory has a copy of the critical directory information and does not rely on repeated accesses to disk for the information.

4.0 Anti-Spyware Integration

The following describes the integration of Anti-Spyware scanning within a proxy appliance. Detection of spyware access is a feature that can be included in a Web Gateway product, such as a proxy appliance, including the integration of Spyware Scanning Engines (SSEs) into the proxy appliance. In this context, the following terms have the following definitions.

An HTTP request is an incoming HTTP request from a client to the proxy. The request may be handed to anti-spyware (ASW) for scanning.

An HTTP response body is the response received from the external server from a forwarded HTTP Request. The body may be scanned for Spyware.

A transaction is an HTTP Request received through HTTP Response Body that is delivered.

4.1 Anti-Spyware Features

The following are examples of spyware features that can be included in implementations or embodiments, although none, some, or all of these particular features may be included in a particular implementation or embodiment.

Scanning can be performed on requested URLs as well as on response bodies.

Scanning work can be performed by one or more external SSE processes, one or more internal SSE processes, or a combination thereof.

A non-blocking interface between the proxy and the SSE(s) can be used to ensure that proxy performance is not needlessly impacted.

An on-box database can be queried for URLs, depending on the capability of the SSE(s). For example, the SSE(s) can perform the query or an open source list can be used by the box.

An on-box database can be queried for IP addresses, depending on the capability of the SSE(s). For example, the SSE(s) can perform the query or an open source list can be used by the box.

An administrator configured whitelist and blacklist, such as through an ACL, can be used, along with administrator configured whitelist and blacklist of IP addresses, domains, or URLs, such as through an ACL. Whitelists and blacklists can be per user group or per destination group. Blacklists can be by filetype, and a factory-installed filetype blacklist can be included. Filtering can also be performed for blacklists or greylists.

Verdicts from response filtering can be logged on URL queries.

The path ending can be used to detect filetype on the request side, and administrator configured blacklist and whitelist of filetypes used. A factory-supplied blacklist of spyware and executable filetypes can be included.

A factory-installed list of spyware user-agents can be used, along with administrator settable blacklist and whitelist of user agents. User agent ACLS can be used.

MIME type can be detected in HTTP responses.

Matching on content type can allow for skipping true-type checking, such as for text only.

SSE(s) can be integrated via an API with the passing of response data to the SSE(s), with support for one or multiple SSE(s). An MD5 hash calculation can be made on the content.

Verdicts are provided by response scanning. Verdicts can be cached. The cache and verdict cache TTLs are configurable.

The response scanning engine can be updated, along with signature updates. Update intervals can be configurable.

Spyware scanning and verdict caching can be enabled and disabled, as necessary.

A maximum object size to scan can be used, along with a scanning timeout. Actions can be specified for large sizes that exceed the specified maximum or when the timeout is exceeded. SSE version numbers can be displayed.

Anti-spyware scanning can be performed per user group and per destination group, with settings per user group and per destination group.

Action settings can be used for internal errors.

Actions can include a "block action" and an "allow action."

Goals can be specified for anti-spyware release criteria and false positive release criteria.

Multiple log types can be supported, with logs recording some or all relevant information. Events to be logged can be specified. An alert can be provided upon engine failure, engine timeouts, and unscannable events.

Feature keys can be used with the anti-spyware engines, including factory supplied anti-spyware feature keys with 30 day evaluations, the use of feature keys to determine what is enable, and a feature key breakout.

Performance can be measure by number of concurrent requests and Mbps throughput.

The web cache can be flushed when anti-spyware updates are implemented. Anti-spyware failures can be configured to be "allow" or "deny."

Scanning can be performed on requested URLs as well as response bodies, with the scanning work performed in one or more external SSE processes.

User agents to be blocked can be based on a global list or on a per user policy. For the former, requests from user agents can be blocked before authentication.

Containers can be scanned to a specified depth, such as 3, depending on the capabilities of the SSE(s). The number of files to be scanned can be specified, depending on the capabilities of the SSE(s). A maximum file size can be specified for true type scanning. In some implementations, a default of not using true type filtering against administrator created whitelist is specified, if supported by the SSE(s).

Multiple scanner modes can be used, along with default scanning modes. Updates can be facilitated by an updated server via a direct connection or via the proxy.

Separate TTL values can be used for good, bad, and unknown verdicts. Reputation based pre-fetch can be used.

Actions can include "warn" and "allow." An alert can be issued on memory/buffer under-run. A response scanning order can be used, along with ClassId scanning. JavaScript interpretation can be included, along with anti-virus integration. Multiple anti-spyware engines can be used.

4.2 Sample Scenarios

The following are sample scenarios for anti-spyware scanning of HTTP requests.

1) HTTP Request received by the proxy, URL scanned by SSE, SSE returns a verdict of Unknown. The ACL rules treat this as non-spyware and ultimately allow the Transaction to proceed.

2) HTTP Request received by the proxy, URL scanned by SSE, SSE returns a verdict of spyware. The ACL rules block this request.

3) HTTP Requests received by the proxy, SSE crashes during scanning. Core proxy 712 reports SSE crash. Core proxy 712 returns verdict of Error, the request may be blocked or allowed depending on ACL configuration.

4) HTTP Requests received by the proxy, scanning takes too long. Core proxy 712 returns a verdict of Timeout, the request may be blocked or allowed depending on ACL configuration.

4.3 ACL Profile

Anti-Spyware scanning is managed and initiated via ACL profiles. Each profile is responsible for passing scan requests to SSEs; receiving scan responses; and logging errors with SSEs. In one implementation, one profile is created for request side scanning and a second profile is created for response side scanning. When an incoming request/response is scanned for spyware, the result that is sent back to ACL is one of:

0: Unknown—The request was scanned but no spyware was found.

1: Timeout—Scanning the request took too long

2: Error—An error caused the request to not be scanned

3-<N>: Spyware was found. The values from 3 up correspond to the Spyware categories as follows: Generic Spyware; Key Logger; Browser Helper; AdWare; System Monitor; Malicious Cookie; Trojan; LSP. The ACL rules determine what action to take based on the verdict.

If the global anti-spyware switch value is disabled, then all incoming scan requests are immediately given a verdict of Unknown.

4.4 Alerts, Error Handling, Logging

An alert is raised if successive failures occur in communication between the core proxy 712 and SSE. Alerting behavior and trigger conditions can be configured for each particular implementation. In one example implementation, the core proxy 712 handles the following error conditions:

1. SSE Wrapper failed and returned an error response. The error is logged and an Error Response is returned to the proxy. It is assumed that the SSE Wrapper is unable to scan the request that failed.

2. SSE Wrapper crashed. The core proxy 712 logs the crash and attempts to reconnect to the SSE Wrapper. A crashed SSE Wrapper is restarted. Unless otherwise documented for a vendor-specific SSE, it is assumed that all outstanding scans will be terminated with a verdict of "Error" and that the crashed SSE Wrapper is restarted.

3. SSE Wrapper timed out. The Proxy logs the timeout and returns a Timeout response to the proxy.

The core proxy 712 is responsible for logging errors and verdicts. At start up, the following additional log entries can be made: SSE Wrapper connection (timestamp, wrapper name and wrapper versions). Wrapper versions may include: SSE Wrapper code version string; SDK Engine version string; SDK Signature version string. Error logging may include the following: Timestamp; Error description; Affected request identifiers (if applicable).

In an embodiment, verdict logging (including Timeout and Error verdicts) include: Timestamp; URL of request; SSE invoked; Verdict (comprising one of the Spyware categories above); Scan Duration in milliseconds; Threat ID; Vendor Threat Name; Vendor Category; Vendor Threat Level; Vendor Recommended Action. In an embodiment, some of the preceding values are determined according to TABLE 12.

TABLE 12

VENDOR VERDICT CAPABILITIES TABLE:

| Vendor | Threat ID | Threat Name | Category | Threat Level | Recommended Action |
|---|---|---|---|---|---|
| SunBelt | S | S | S | S | N |
| Aluria | N | N | N | N | N |
| McAfee | N | S | S | N | N |
| WebRoot | Y | N | N | N | N |
| JavaCool | N | N | N | N | N |

Legend:
N: Does not provide the capability
R: Provides the capability for request side scanning only
S: Provides the capability for response side scanning only
Y: Provides the capability for both request and response side scanning.

4.5 Wrapper, API, Socket Examples

In an embodiment, an SSE Wrapper 804A encapsulates a particular Anti-Spyware vendor's SDK. An SSE wrapper 804A runs as a separate process in proxy appliance 506 to ensure that in the event it crashes, the rest of the system is not brought down with it. The core proxy 712 and the SSEs 708A, 708B, 708C communicate over two UNIX domain sockets comprising a Query socket and a Data socket. The Query socket is used for sending scan requests to an SSE 708A and for the scan answers. The Data socket is used to send response body (file) content to the SSEs 708A, 708B, 708C. The Proxy is the server (listen) side for all sockets.

In an embodiment, the Query socket has a name like /tmp/merlin_query.sock.USER, where "merlin" is the name of the SSE and USER is the username. Sockets include usernames so that multiple users don't conflict with the same socket name. The core proxy 712 initiates a scan by sending a ScanMessage message on the socket. In an embodiment, a ScanMessage message comprises a header having fields denoted sm_magic; sm_version; sm_proxId; sm_scanType; sm_verdict; sm_numFields; and sm_length. In an embodiment, "sm_magic" is a magic number used as a sanity check that this is the start of a valid message. "sm_version" is the version number of the protocol. "sm_proxId" is an index inside the Proxy that identifies this request. "sm_scanType" identifies the type of scan (URL or file). "sm_verdict" is unused (always 0) in the request message from the Proxy to the SSE, it is filled in by the SSE in its answer.

The header is immediately followed by some number of fields (sm_numFields) and combined total length (sm_length) of items in this format: xxx \n NAME \n yyy \n VALUE \n where xxx is the decimal length of NAME and yyy is the decimal length of VALUE. In an embodiment, the magic number 0x7373656d is ASCII for "ssem", Spyware Scanning Engine Message.

The SSE 708A, 708B, 708C answers the request with the same ScanMessage, except with sm_verdict filled in. The answer message doesn't require any extra fields, so the SSE can set sm_numFields and sm_length to 0. In an embodiment, a verdict comprises values indicating whether the verdict is SV_UNKNOWN=0, SV_TIMEOUT, SV_ERROR, SV_GENERIC_SPYWARE, SV_KEYLOGGER, SV_BROWSER_HELPER, SV_ADWARE, SV_SYSTEM_MONITOR, SV_MALICIOUS_COOKIE, SV_TROJAN, SV_LSP. In an embodiment, an invalid sm_magic field implies that the core proxy 712 and SSE 708A, 708B, 708C have lost synchronization. If this happens, the core proxy 712 closes the socket and waits for the SSE to reconnect. In the event that the sm_version fields disagree, the message is discarded and an error logged.

In an embodiment, the Data socket has a name like /tmp/merlin_data.sock.USER. For a response body (file) scan, the SSE sends a request for a piece of the file with a RangeMessage message, which comprises, in one embodiment, fields denoted rm_magic; rm_version; rm_proxId; rm_sseId; rm_start; rm_length; rm_flags. The core proxy 712 answers with the same RangeMessage message followed by rm_length bytes of content. The core proxy 712 may return a lower rm_length field if more than that number of bytes are currently not available. The core proxy 712 sets the SSE_EOF flag if this range reaches end of file.

The core proxy 712 sets the SSE_ERROR flag if there is something wrong with the request, such as an invalid rm_proxId value. If the request is valid but there is a fatal error in providing the response body, or if the core proxy 712 has received a verdict from another SSE and wishes to terminate the scan, then the core proxy 712 returns a SSE_KILL_SCAN message on the Query socket.

An invalid rm_proxId value does not necessarily imply an internal error, since the error can result from bad timing. For example, the core proxy 712 starts two scans on two SSEs, one scan finishes and returns a verdict of spyware, the other scan is still requesting response content. When the core proxy 712 receives the spyware verdict, the core proxy will send a SSE_KILL_SCAN message to the other SSE and delete its records for that proxId. The other request may be in the socket's queue when that happens, so when the core proxy 712 receives that request for content, it will treat proxId as invalid. But this is not a true error.

For SSEs that perform a random access scan, the SSE asks for the length of the file. One way of doing this is for the SSE to set rm_start and rm_length to 0 and rm_flags to SSE_EOF. Then, the core proxy 712 responds with rm_start set to the length of the file, rm_length is 0 and rm_flags contains SSE_EOF.

5.6 Configuration Files

SSE config files explain to the core proxy 712 the parameters and capabilities of the various Spyware Scanning Engines. There is one file per spyware scanning engine. These files can be located anywhere on the file system, but it is recommended they are co-located near the Spyware Scanning engine software and/or other SSE-specific configuration.

For example, the core proxy 712 config variable sseConfigFiles is a comma-separated list of files (absolute path or relative to the core proxy 712's bin directory), one file per spyware engine. Each spyware engine is included in this variable, thereby allowing the core proxy 712 to know how many engines are available and how to communicate with them (e.g., their sockets). The files are text files with one option per line.

5.7 WRBS Table

The following TABLE 13 presents actions to be taken based on a WRBS (web reputation based sender) score within a range of −10 to +10:

TABLE 13

| ACTIONS BASED ON WRBS SCORE VALUE | |
|---|---|
| WBRS Score | Action |
| −10 to −5 | Blocked |
| −4 to +5 | Scan as configured |
| +6 to +10 | Allow |

ACL rules can specify whether to scan with one or more SSE(s). With WRBS scores, one or more engines can be used for scanning based on the WRBS score.

5.8 Multiple Scan Engines

A transaction comprises a single request and a response. During the transaction phase, there are a number of decision stages at which a decision can be made whether the transaction is allowed or blocked. For a request side, the following decision stages are provided: Exception List; Admin WhiteList/BlackList; File Extension; WBRS; ASW Request Scanning. For a response, the following decision stages are provided: Content Type; True Type; CLSID; MD5 checksum; ASW Response Scanning.

Approximate percentages of requests that can be decided to be allowed or blocked on the request side as a whole can be used. For example, in one exemplary implementation, the goal is that a decision to either allow or block can be made for 80% of the requests in the request side. The decision can be based on WRBS that has a set of whitelists and blacklists On the response side, Content Type, True Type, MD5 checksum verification, and CLSID stages help to decide a further reduction of the requests, such as a 19% reduction. Thus, in this exemplary implementation, about 1% of the transactions are subjected to response scanning.

The percentages for the request side in this exemplary implementation are based on the following factors. Typically in an enterprise, most of the internal/in-house websites and resources will either be in the exception list or the whitelist configured by the administrator. Most commonly accessed sites that are safe will be whitelisted by WBRS. Most of the known malware sites will be blacklisted by WBRS. Anti-spyware (ASW) request scanning will further catch a good percentage of the spyware sites.

The percentages for the response side in this exemplary implementation are based on the following: Image files can be identified by the 'Content-Type' response header. (Preference is given to content-type rather than extension since browsers depend on content-type rather than extension alone). Image files need not be subjected to scanning. Image files account for a substantial percentage of transactions. Text files can be identified by the 'Content-Type' response header and need not be subjected to scanning. HTML files can be identified by the 'Content-Type' response header. HTML files can be subjected to CLSID checks. Unless the anti-malware scan engines parse and detect embedded links in the html page and determine whether the links point to spyware objects or not, it is generally not necessary to subject html files for scanning. The only transactions that need to be scanned are non-html, non-text, non-images such as .exe, .dll, .scr, .zip, et.

Administrators can configure whether the transaction should be subjected to a single scan or multiple scans. When multiple scan is selected, the system decides the order by itself based on performance and efficacy.

Responses are first sent to the first ASW scan engine. The scan engine return values can be classified into 2 sets: —malware is detected—malware is not detected. If a malware is detected, then irrespective of the scan choices set by administrator, the response will be blocked and an error page sent back. If a malware is not detected and if multiple scan engines are selected, the response will be sent to the next scan engine.

Having a response being scanned by multiple scan engines may be seen as inherently slow. While this is true for the response being scanned, since less than 1% of the requests are even going to be scanned on the response side, the overall performance of the system to not be affected by these 1% of the requests, in this exemplary implementation.

The UI provides an option for the administrator to enable or disable response scanning by multiple scan engines for the system as a whole.

Responses can be sent to all scanning engines simultaneously to speed up response scanning. If the first scan engine responds back with a result that a malware is detected, the block page is sent back and the simultaneous scan on the other scan engine is aborted. Parallel scanning can lead to improved system performance when multiple scanning is involved.

Scanning can be implemented entirely within the core proxy 712. Based on the administrator settings, when the response arrives from the server, the proxy decides how this response must be scanned. The core proxy 712 hands out queries to the various active SSE Wrappers as determined by the configuration setting for multiple scans.

5.9 Verdict Caching

The main purpose of verdict caching is to avoid the expensive operation of a response body scan if the same object has been recently scanned. Such an optimization can be implemented in whole or in part or even not at all, depending on the particular implementation. Verdict caching can be based on one or more of the following: MD5 hash, MD5 hash plus size, CLSID, URL, and domain.

For a URL-based verdict cache, a hash table of URLs and verdicts is kept. Whenever a response scan finishes, its URL and verdict are added to the table, up to some maximum size of table. Items are removed from the table by the least recently used (LRU) criteria to keep the table within its maximum size. Also, items have a maximum lifetime and are removed when that time is up. The benefit of the URL-based cache is that it catches multiple requests to the same location. If many users click on the same link, then only the first needs to be scanned. Also, the contents of the cache can be used at both the URL and response stages. Positive (spyware) and negative (clean/unknown) verdicts can be cached, but not timeout or error. Configuration variables include: verdictCacheEnable—a global on/off switch for verdict caching, verdictCacheTtl—the maximum time to live for a cache item, and verdictCacheUrlTableSize—the size of the URL-based table.

For an MD5-based verdict cache, a hash table of MD5 sums of response bodies and their and verdicts is kept. When a response scan finishes, the MD5 sum and verdict is added to the table. This involves computing MD5 sums of response bodies as they arrive from the server. The benefit of the MD5-based cache is that it catches the same object in multiple locations. The URL-based cache would eventually catch the same items, but it would require one scan and one cache entry for each location. Configuration variables include: verdictCacheMd5TableSize—the size of the MD5-based table.

For a PFP-based verdict cache, the verdicts are piggybacked onto the PermFilePrologue (PFP) structure. The core proxy 712 already has a hash table of the responses that it has cached, both in-memory and on-disk. Each response in the cache comprises a PFP storing the content length, server name, cacheability flags, cache expiration time, etc. A verdict field is added to the PFP for those responses that have already been scanned, which ties the cacheability of the verdict to the cacheability of the response. In particular, responses that are not HTTP cacheable cannot have their verdicts cached with this approach. Further, in an embodiment the verdict is cached only if the full response is stored.

This approach is used for several reasons. First, the verdict is computed from the response, and therefore the lifetime of a verdict is tied to the lifetime of its response. Second, if an object is not HTTP cacheable (e.g., it has customized content from cookies), then the response may change with each request and the system shouldn't cache its verdict. Third, it may seem wasteful to store the full spyware object just to remember that it is spyware. But actually, the object was stored in order to scan it to determine that it was spyware in the first place. The implementation of the PFP approach is somewhat different than the URL approach. The core proxy 712/SSE interface (proxy side) hides many of the scanning details and the URL approach fits into that interface as the first layer. In the PFP approach, when a request is received and is found in the cache, its verdict (if available) is added to the state of the ACL rules, whether the result of a scan is wanted or not (e.g., it's possible that the response was previously whitelisted or otherwise got into the cache without a scan, so it may or may not already have a verdict.)

In an embodiment, the slowest step inside the core proxy 712 is generally scanning response bodies, so the fraction of requests that are sent to the SSE is a factor in overall core proxy 712 performance. White/blacklists, WBRS and URL/request scans try to reduce this fraction, but some requests will get through and need to be scanned. The verdict cache provides a backup to ensure that needless work scanning responses is avoided when the result is already known.

The approach herein is efficient. In URL-based verdict caching, assume 200-300 bytes per URL, plus some tens of bytes for pointers and list and hash table overhead, times 2000 entries. This fits 2000 entries into 1 Meg bytes, a modest size.

The following are exemplary configuration variables, some, all, or none of which may be included in a particular implementation, with sample default values being provided as shown below.

sseEnable—boolean, if off, then the core proxy 712 doesn't create the query and data sockets and all spyware scans (URL and file) immediately return a verdict of Unknown. Default: 1 (on).

sseconfigFiles—a comma-separated list of spy config files, one file per engine. Default: empty (no scanning engines).

sseQueryTimeout—the maximum time in seconds for a scan request. After this time, the scan is terminated and the verdict of SV_TIMEOUT (1) is returned. Default: 10 (seconds).

sseMaximumUrlLength—the maximum length of a URL that can be scanned. A URL longer than this limit is immediately given a verdict of Unknown. Default: 4096.

verdictCacheEnable—boolean, global on/off switch for verdict caching. Default: 1 (on).

verdictCacheTtl—integer, the maximum number of seconds that an entry can stay in the verdict cache. Default: 14400 (4 hours).

verdictCacheUrlTableSize—integer, the maximum number of entries in the URL verdict cache hash table. Default: 2000.

verdictCacheMd5TableSize—integer, the maximum number of entries in the MD5 verdict cache hash table. Default: 2000.

6.0 Implementation Mechanisms—Hardware Overview

The approach for managing traffic and filtering responses described herein may be implemented in a variety of ways and the invention is not limited to any particular implementation. The approach may be integrated into a computing system or a computing device, or may be implemented as a stand-alone mechanism. Furthermore, the approach may be implemented in computer software, hardware, or a combination thereof. Also, the techniques described herein are not limited to the HTTP context and can be applied to other traffic besides HTTP traffic and other responses besides HTTP responses.

FIG. 1 is a block diagram that depicts a computer system 100 upon which an embodiment may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for implementing the techniques described herein. According to one embodiment, those techniques are performed by computer system 100 in response to processor 104 executing one or more sequences of one or more instructions contained in main memory 106. Such instructions may be read into main memory 106 from another machine-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution. In this manner, computer system 100 may obtain application code in the form of a carrier wave.

7.0 Extensions and Alternatives

In the foregoing description, the invention has been described with reference to specific embodiments thereof. It will, however, be evident that various modifications and changes may be made thereto without departing from the broader spirit and scope of the invention. Thus, the specification and drawings are, accordingly, to be regarded in an illustrative rather than a restrictive sense. The invention includes other contexts and applications in which the mechanisms and processes described herein are available to other mechanisms, methods, programs, and processes.

In addition, in this description, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps. Furthermore, other embodiments may use more or fewer steps than those discussed herein.

What is claimed is:

1. A data processing apparatus, comprising:
    at least one processor;
    a traffic monitor comprising logic which, when executed by the at least one processor, causes the at least one processor to perform:
        creating, using forward Domain Name System (DNS) lookups, a mapping of domain names to Internet Protocol (IP) addresses;
        wherein the mapping identifies only those domain names that are associated with malware;
        determining whether a particular domain in the mapping requires handling data traffic to or from the particular domain by performing a particular action;
        based on the mapping, determining one or more IP addresses that are associated with the particular domain;
        generating policy for a firewall that instructs the firewall to perform the particular action upon receiving a request that specifies one or more IP addresses that are associated with the particular domain;
        upon receiving a particular request comprising a particular IP address, using the policy and the mapping to determine whether the particular IP address is one of the one or more IP addresses associated with the particular domain to indicate that the particular action should be performed.

2. The apparatus of claim 1, wherein the traffic monitor further comprises logic which, when executed by the processor, causes the processor to perform:
    using a DNS discovery process and a DNS traffic monitoring process to create the mapping;
    observing the forward DNS lookups from an internal network and inspecting DNS transactions that take place in the internal network.

3. The apparatus of claim 1, wherein the traffic monitor further comprises logic which, when executed by the processor, causes the processor to perform sending instructions to the firewall for determining whether the particular request is to access any of the one or more IP addresses that are associated with the particular domain.

4. The apparatus of claim 1, wherein the particular action includes any of:
    precluding traffic to the particular domain, precluding traffic from the particular domain, diverting traffic to the particular domain, diverting traffic from the particular domain, maintaining a log of activities at the particular domain, logging traffic information related to the particular domain, blocking or reporting on DNS hosts that belong to the particular domain, blocking or reporting on host-port combinations, blocking or reporting on domain-port combinations;
    wherein the mapping further comprises state information and other information specific to the domain names.

5. The apparatus of claim 1, wherein the traffic monitor further comprises logic which, when executed by the processor, causes the processor to perform:
    retrieving, from a web reputation service, reputation scores for the particular domain and reputation scores for subdomains that belong to the particular domain;
    querying whitelists and blacklists.

6. The apparatus of claim 1, wherein the policy is further defined for an individual user or for groups of individual users.

7. A non-transitory computer-readable storage medium storing one or more sequences of instructions which, when executed by one or more processors, cause the one or more processors to perform:
    creating, using forward Domain Name System (DNS) lookups, a mapping of domain names to Internet Protocol (IP) addresses;
    wherein the mapping identifies only those domain names that are associated with malware;
    determining whether a particular domain in the mapping requires handling data traffic to or from the particular domain by performing a particular action;
    based on the mapping, determining one or more IP addresses that are associated with the particular domain;
    generating policy for a firewall that instructs the firewall to perform the particular action upon receiving a request that specifies one or more IP addresses that are associated with the particular domain;
    upon receiving a particular request comprising a particular IP address, using the policy and the mapping to determine whether the particular IP address is one of the one or more IP addresses associated with the particular domain to indicate that the particular action should be performed.

8. The non-transitory computer-readable storage medium of claim 7, further comprising instructions which, when executed by the one or more processors, cause the one or more processors to perform:
    using a DNS discovery process and a DNS traffic monitoring process to create the mapping;
    observing the forward DNS lookups from an internal network and inspecting DNS transactions that take place in the internal network.

9. The non-transitory computer-readable storage medium of claim 7, further comprising instructions which, when executed by the one or more processors, cause the one or more processors to perform sending instructions to the firewall for determining whether the particular request is to access any of the one or more IP addresses that are associated with the particular domain.

10. The non-transitory computer-readable storage medium of claim 7, wherein the particular action includes any of: precluding traffic to the particular domain, precluding traffic from the particular domain, diverting traffic to the particular domain, diverting traffic from the particular domain, maintaining a log of activities at the particular domain, logging traffic information related to the particular domain, blocking or reporting on DNS hosts that belong to the particular domain, blocking or reporting on host-port combinations, blocking or reporting on domain-port combinations;
    wherein the mapping further comprises state information and other information specific to the domain names.

11. The non-transitory computer-readable storage medium of claim 7, further comprising instructions which, when executed by the one or more processors, cause the one or more processors to perform:
retrieving, from a web reputation service, reputation scores for the particular domain and reputation scores for subdomains that belong to the particular domain;
querying whitelists and blacklists.

12. The non-transitory computer-readable storage medium of claim 7, wherein the policy is further defined for an individual user or for groups of individual users.

13. A method, comprising:
creating, using forward Domain Name System (DNS) lookups, a mapping of domain names to Internet Protocol (IP) addresses;
wherein the mapping identifies only those domain names that are associated with malware;
determining whether a particular domain, listed on the mapping, requires handling data traffic to or from the particular domain by performing a particular action;
based on the mapping, determining one or more IP addresses that are associated with the particular domain;
generating policy for a firewall that instructs the firewall to perform the particular action upon receiving a request that specifies one or more IP addresses that are associated with the particular domain;
upon receiving a particular request comprising a particular IP address, using the policy and the mapping to determine whether the particular IP address is one of the one or more IP addresses associated with the particular domain to indicate that the particular action should be performed;
wherein the method is performed by one or more processors.

14. The method of claim 13, further comprising:
using a DNS discovery process and a DNS traffic monitoring process to create the mapping;
observing the forward DNS lookups from an internal network and inspecting DNS transactions that take place in the internal network.

15. The method of claim 13, further comprising sending instructions to the firewall for determining whether the particular request is to access any of the one or more IP addresses that are associated with the particular domain.

16. The method of claim 13, wherein the particular action includes any of:
precluding traffic to the particular domain, precluding traffic from the particular domain, diverting traffic to the particular domain, diverting traffic from the particular domain, maintaining a log of activities at the particular domain, logging traffic information related to the particular domain, blocking or reporting on DNS hosts that belong to the particular domain, blocking or reporting on host-port combinations, blocking or reporting on domain-port combinations;
wherein the mapping further comprises state information and other information specific to the domain names.

17. The method of claim 13, further comprising:
retrieving, from a web reputation service, reputation scores for the particular domain and reputation scores for subdomains that belong to the particular domain;
querying whitelists and blacklists.

18. The method of claim 13, wherein the policy is further defined for an individual user or for groups of individual users.

* * * * *